US012770917B2

(12) United States Patent
Lee et al.

(10) Patent No.: US 12,770,917 B2
(45) Date of Patent: Oct. 20, 2026

(54) ELECTROCHEMICAL DEVICE AND MANUFACTURING METHOD THEREFOR

(71) Applicants: UBATT INC., Seoul (KR); UNIST(ULSAN NATIONAL INSTITUTE OF SCIENCE AND TECHNOLOGY), Ulsan (KR)

(72) Inventors: Chang Kyoo Lee, Seoul (KR); Sang Young Lee, Seoul (KR)

(73) Assignees: UBATT INC., Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 790 days.

(21) Appl. No.: 17/310,637

(22) PCT Filed: Feb. 14, 2020

(86) PCT No.: PCT/KR2020/002105

§ 371 (c)(1),
(2) Date: Aug. 13, 2021

(87) PCT Pub. No.: WO2020/167022

PCT Pub. Date: Aug. 20, 2020

(65) Prior Publication Data

US 2022/0123361 A1 Apr. 21, 2022

(30) Foreign Application Priority Data

Feb. 15, 2019 (KR) ........................ 10-2019-0018087

(51) Int. Cl.

| | |
|---|---|
| ***H01M 10/0565*** | (2010.01) |
| ***H01M 4/02*** | (2006.01) |
| ***H01M 4/38*** | (2006.01) |
| ***H01M 10/0525*** | (2010.01) |
| ***H01M 10/058*** | (2010.01) |

(52) U.S. Cl.

CPC ... *H01M 10/0565* (2013.01); *H01M 10/0525* (2013.01); *H01M 10/058* (2013.01); *H01M 2004/021* (2013.01); *H01M 2004/027* (2013.01); *H01M 2004/028* (2013.01); *H01M 4/382* (2013.01); *H01M 2300/0082* (2013.01)

(58) Field of Classification Search

CPC ......... H01M 10/0525; H01M 10/0565; H01M 10/058; H01M 4/382; H01M 2004/021; H01M 2004/027; H01M 2004/028; H01M 2300/0082

See application file for complete search history.

(56) References Cited

U.S. PATENT DOCUMENTS

| | | | | |
|---|---|---|---|---|
| 2011/0117422 | A1 | 5/2011 | Lee et al. | |
| 2011/0287325 | A1 | 11/2011 | Zaghib et al. | |
| 2011/0318614 | A1 | 12/2011 | Takeshi et al. | |
| 2015/0333310 | A1* | 11/2015 | Choi ................... | H01M 50/451 429/145 |
| 2016/0344008 | A1 | 11/2016 | Eitouni et al. | |
| 2017/0092975 | A1 | 3/2017 | Kim et al. | |
| 2019/0372150 | A1* | 12/2019 | Busacca .............. | H01M 10/049 |
| 2021/0151837 | A1* | 5/2021 | Shimizu .............. | H01M 50/533 |

FOREIGN PATENT DOCUMENTS

| | | | |
|---|---|---|---|
| CN | 102405551 | A | 4/2012 |
| JP | 2006-261129 | A | 9/2006 |
| KR | 10-1998-0019330 | A | 6/1998 |
| KR | 10-2004-0084117 | A | 10/2004 |
| KR | 10-2007-0082402 | A | 8/2007 |
| KR | 10-2012-0129493 | A | 11/2012 |
| KR | 10-2015-0136397 | A | 12/2015 |
| KR | 10-2017-0058344 | A | 5/2017 |
| KR | 10-2020-0099883 | A | 8/2020 |
| WO | 2018062882 | A1 | 4/2018 |

OTHER PUBLICATIONS

Machine Translation of Park (Year: 2021).*
International Search Report of PCT Application No. PCT/KR2020/002105—4 pages (May 15, 2020).
Notice of Allowance in Chinese Patent Application No. 202080014643.5 issued on Apr. 3, 2024, 7 pages.

* cited by examiner

*Primary Examiner* — Matthew T Martin
*Assistant Examiner* — Ankith R Sripathi
(74) *Attorney, Agent, or Firm* — CANTOR COLBURN LLP

(57) ABSTRACT

The present invention relates to an electrochemical device and a manufacturing method therefor. More specifically, the present invention relates to an electrochemical device in which, in an electrode assembly composed of a cathode, a separator, and an anode, at least one or more of the cathode, the separator, and the anode are formed of a gel polymer electrolyte and have different ion conductivities, and a manufacturing method therefor. Since the electrochemical device of the present invention includes electrolytes having different ion conductivities in at least one of the cathode, the separator, and the anode, it is possible to provide the optimized flow of ions for the separator and each electrode. Accordingly, the present invention has advantageous effects in improving the lifespan and safety of the electrochemical device.

18 Claims, No Drawings

ELECTROCHEMICAL DEVICE AND MANUFACTURING METHOD THEREFOR

TECHNICAL FIELD

The present invention relates to an electrochemical device and a manufacturing method therefor, and more particularly, to an electrochemical device in which, in an electrode assembly composed of a cathode, a separator, and an anode, at least one or more of the cathode, the separator, and the anode are formed of a gel polymer electrolyte and have different ion conductivities, and method for manufacturing the same.

In the electrochemical device according to an aspect of the present invention, a separate electrolyte may be introduced into each of the cathode, the separator, and the anode. In this case, the electrolyte may be fed to each of the cathode, the separator, and the anode in an optimized composition. Accordingly, the present invention has an advantageou effect in improving the lifespan characteristics and safety the electrochemical device by adjusting the optimized flow of ions for the separator and each of the electrodes.

BACKGROUND ART

A secondary battery is manufactured by installing an electrode assembly composed of an anode, a cathode, and a separator inside a metal can in a cylindrical or angular shape, or a pouch-type case of an aluminum laminate sheet and injecting an electrolyte into the electrode assembly.

A liquid-phase electrolyte obtained by dissolving a salt in a non-aqueous organic solvent has been mainly used as the electrolyte for a secondary battery. However, it is difficult to realize different types of electrochemical devices having high stability using such a liquid-phase electrolyte because it causes various problems of deteriorating electrode materials, causing a leakage of the liquid-phase electrolyte, and the like, as well as a high risk of volatilization of the organic solvent.

In recent years, to solve the problem regarding the stability of this liquid electrolyte, gel polymer electrolytes, solid polymer electrolytes, or the like having no risk of leakage have been developed.

In a method for manufacturing a battery to which a gel polymer electrolyte is applied, a battery is generally manufactured by installing an electrode assembly inside a can or a pouch-type case, injecting a precursor solution, which may form a gel polymer matrix including an electrolyte salt, an electrolyte solvent, a cross-linked polymer, and the like, all together, and gelling the precursor solution by processing at a certain temperature for a certain time.

When a gel polymer electrolyte is introduced using such a conventional method, it takes a long time to gel the precursor solution, and may form only one electrolyte matrix exclusive for each of the electrode and the separator. Also, it is difficult to impregnate a gel polymer matrix precursor solution into an electrode assembly composed of recently used high-density electrodes for a high energy density battery.

Also, when the gel polymer electrolyte or the liquid electrolyte is injected at once using the above-described method, it has a problem in that an electrolyte solution is not uniformly impregnated into the electrode assembly, or often has a problem in that, due to a difference in energy levels between the cathode and the anode, each of the electrolytes may participate in an oxidation or reduction reaction to cause side reactions, which results in degraded battery performance.

It is necessary to use an electrolyte suitable for each of the cathode and the anode in order to suppress such side reactions of the electrolyte, but such an electrolyte may not be used in the existing methods for injecting a liquid-phase electrolyte or a gel polymer electrolyte.

Related Art Document

Registered Korean Patent No. 10-0525278 (Oct. 25, 2005)

DISCLOSURE

Technical Problem

Objects of the present invention are designed to solve a problem of forming the same electrolyte in a cathode, an anode, and a separator when a liquid-phase electrolyte or a gel polymer electrolyte is injected into the cathode, the anode, and the separator and a problem of causing side reactions in the cathode and the anode. Specifically, an object of the present invention is to provide an electrochemical device capable of adjusting the flow of ions optimized for each of electrodes by forming a gel polymer electrolyte in at least one or two of a cathode, a separator, and an anode using an application method and injecting a liquid electrolyte into the other(s).

Another object of the present invention is to provide an electrochemical device capable of adjusting the flow of ions optimized for each of electrodes and a separator to further improve the lifespan characteristics and safety of the electrochemical device by forming a gel polymer electrolyte in all of a cathode, a separator, and an anode using an application method, wherein at least any one or more of the cathode, the separator, and the anode include any one or more selected from different types of solvents, different types of dissociable salts, and different concentrations of the dissociable salts.

Still another object of the present invention is to provide an electrochemical device capable of simply forming a gel polymer electrolyte using an application method such as coating, printing, or the like, being continuously produced, and easily adjusting a thickness thereof.

Yet another object of the present invention is to provide an electrochemical device capable of being applied to flexible devices because the electrochemical device has flexibility since the electrochemical device includes a gel polymer electrolyte in all of a cathode, a separator, and an anode, and of being applied to curved planes other than flat planes and forming a battery in various shapes quite freely because the battery may be formed in various shapes using a method such as cutting, or the like.

Yet another object of the present invention is to provide an electrochemical device having superior charge/discharge efficiency and lifespan characteristics of a battery because a suitable performance improving agent may be included in each of the cathode, the separator, and the anode.

Technical Solution

In one general aspect, an electrochemical device includes:

a cathode-electrolyte complex including a first electrolyte in a cathode, an anode-electrolyte complex including a second electrolyte in an anode, and a separator-electrolyte complex including a third electrolyte in a separator, wherein at least any one or more selected from the first electrolyte, the second electrolyte, and the third electrolyte are gel polymer electrolytes, and at least any one or more selected from the first electrolyte, the second electrolyte, and the third electrolyte have different ion conductivities.

In another general aspect, a method for manufacturing an electrochemical device includes:

a) applying a first gel polymer electrolyte composition onto a cathode and curing the first gel polymer electrolyte composition to manufacture a cathode-electrolyte complex including a first electrolyte;

b) stacking the cathode-electrolyte complex, the separator, and the anode to manufacture an electrode assembly; and c) sealing the electrode assembly with a packaging material, followed by injection of a liquid electrolyte, wherein the first electrolyte and the liquid electrolyte have different ion conductivities.

In still another general aspect, a method for manufacturing an electrochemical device includes:

a) applying a second gel polymer electrolyte composition in an anode and curing the second gel polymer electrolyte composition to manufacture an anode-electrolyte complex including a second electrolyte;

b) stacking a cathode, a separator, and the anode-electrolyte complex to manufacture an electrode assembly; and c) sealing the electrode assembly with a packaging material, followed by injection of a liquid electrolyte, wherein the second electrolyte and the liquid electrolyte have different ion conductivities.

In yet another general aspect, a method for manufacturing an electrochemical device includes:

a) applying a third gel polymer electrolyte composition in a separator and curing the third gel polymer electrolyte composition to manufacture a separator-electrolyte complex including a third electrolyte;

b) stacking a cathode, the separator-electrolyte complex, and an anode to manufacture an electrode assembly; and c) sealing the electrode assembly with a packaging material, followed by injection of a liquid electrolyte, wherein the third electrolyte and the liquid electrolyte have different ion conductivities.

In yet another general aspect, a method for manufacturing an electrochemical device includes:

a) applying a first gel polymer electrolyte composition onto a cathode and curing the first gel polymer electrolyte composition to manufacture a cathode-electrolyte complex including a first electrolyte, and applying a second gel polymer electrolyte composition onto an anode and curing the second gel polymer electrolyte composition to manufacture an anode-electrolyte complex including a second electrolyte;

b) stacking the cathode-electrolyte complex, a separator, and anode-electrolyte complex to manufacture an electrode assembly; and c) sealing the electrode assembly with a packaging material, followed by injection of a liquid electrolyte, wherein at least any one or more selected from the first electrolyte, the second electrolyte, and the liquid electrolyte have different ion conductivities.

In yet another general aspect, a method for manufacturing an electrochemical device includes:

a) applying a first gel polymer electrolyte composition onto a cathode and curing the first gel polymer electrolyte composition to manufacture a cathode-electrolyte complex including a first electrolyte, and applying a third gel polymer electrolyte composition onto a separator and curing the third gel polymer electrolyte composition to manufacture a separator-electrolyte complex including a third electrolyte;

b) stacking the cathode-electrolyte complex, the separator-electrolyte complex, and an anode to manufacture an electrode assembly; and c) sealing the electrode assembly with a packaging material, followed by injection of a liquid electrolyte, wherein at least any one or more selected from the first electrolyte, the third electrolyte, and the liquid electrolyte have different ion conductivities.

In yet another general aspect, a method for manufacturing an electrochemical device includes:

a) applying a second gel polymer electrolyte composition onto an anode and curing the second gel polymer electrolyte composition to manufacture an anode-electrolyte complex including a second electrolyte, and applying a third gel polymer electrolyte composition onto a separator and curing the third gel polymer electrolyte composition to manufacture a separator-electrolyte complex including a third electrolyte;

b) stacking a cathode, the separator-electrolyte complex, and the anode-electrolyte complex to manufacture an electrode assembly; and c) sealing the electrode assembly with a packaging material, followed by injection of a liquid electrolyte, wherein at least any one or more selected from the second electrolyte, the third electrolyte, and the liquid electrolyte have different ion conductivities.

In yet another general aspect, a method for manufacturing an electrochemical device includes:

i) applying a first gel polymer electrolyte composition onto a cathode and curing the first gel polymer electrolyte composition to manufacture a cathode-electrolyte complex including a first electrolyte, applying a second gel polymer electrolyte composition onto an anode and curing the second gel polymer electrolyte composition to manufacture an anode-electrolyte complex including a second electrolyte, and applying a third gel polymer electrolyte composition onto a separator and curing the third gel polymer electrolyte composition to manufacture a separator-electrolyte complex including a third electrolyte; and ii) stacking the cathode-electrolyte complex, the separator-electrolyte complex, and the anode-electrolyte complex to manufacture an electrode assembly, wherein at least any one or more selected from the first electrolyte, the second electrolyte, and the third electrolyte have different ion conductivities.

Advantageous Effects

In an electrochemical device according to an aspect of the present invention, a separate electrolyte can be introduced into each of a cathode, a separator, and an anode. In this case, the electrolyte can be fed to each of the cathode, the separator, and the anode in an optimized composition. Therefore, the present invention has a more desirable effect in adjusting the flow of ions optimized for each of the electrode and the separator, thereby improving the lifespan characteristics and safety of the electrochemical device.

Also, the electrochemical device according to an aspect of the present invention includes at least one gel polymer electrolyte, and components of the gel polymer electrolyte are not well miscible with components of a liquid electrolyte injected later because the gel polymer electrolyte is in a cross-linked state. Therefore, the present invention can be effective for adjusting the flow of ions optimized for the initial purpose even when the electrochemical device is used for a long time.

In addition, even when a gel polymer electrolyte is included in all of the cathode, the separator, and the anode, the respective electrolytes are less likely to be miscible with each other. Therefore, the present invention can be effective for adjusting the flow of ions optimized for the initial purpose even when the electrochemical device is used for a long time.

Also, the gel polymer electrolyte according to an aspect of the present invention has a characteristic of easy impregnation into a high-density electrode for a high energy density battery, which has a porosity of 20% by volume or less, due to its intrinsic rheological characteristics by which the gel polymer electrolyte has such a viscosity that the gel polymer electrolyte can be directly applied to an electrode.

Furthermore, when a gel polymer electrolyte is used in at least one or more selected from the cathode, the separator, and the anode, the gel polymer electrolyte can be applied using coating processes such as bar coating, spin coating, slot die coating, dip coating, spray coating, and the like, as well as printing processes such as roll-to-roll printing, ink-jet printing, gravure printing, gravure offset, aerosol printing, stencil printing, screen printing, and the like, and the electrodes and the separator can be continuously manufactured, resulting in improved productivity. Also, the gel polymer electrolyte layer can come into uniform and close contact with the cathode, the separator, or the anode, and can be uniformly impregnated into the central region of a battery.

Further, because the gel polymer electrolyte can be directly applied onto an electrode to form a gel polymer electrolyte layer, the interface between the electrode and the gel polymer electrolyte layer can be stabilized to improve performance of the electrochemical device. When the electrochemical device is applied to a flexible battery, the stable battery performance can be realized even when a change in shape of the battery is caused due to various external forces. Therefore, the present invention can be effective for suppressing risks that can be caused due to the change in shape of the battery.

Best Mode

Hereinafter, the present invention will be described in further detail with reference to embodiments or examples thereof. However, it should be understood that the following embodiments or examples are illustrative only to describe the present invention in detail, but are not intended to limit the scope of the present invention, and may be embodied in various forms.

Also, unless otherwise defined, all technical and scientific terms used herein have the same meaning as commonly understood by one of ordinary skill in the art to which the present invention pertains. The terms used in the description in the present invention are given only for effectively describing specific embodiments and are not intended to limit the present invention.

Also, the singular forms used in the specification and the appended claims may be intended to include the plural forms as well, unless the context clearly indicates otherwise.

In the present invention, the term "electrode assembly" refers to an assembly in which a cathode, a separator, and an anode are stacked or stacked in a jelly roll state, and means a state before sealing with a packaging material.

In the present invention, the term "electrochemical device" refers to a state in which the electrode assembly may be sealed with a packaging material and used as a battery.

In the present invention, an electrolyte formed on a cathode is indicated as a first electrolyte, an electrolyte formed on an anode is indicated as a second electrolyte, and an electrolyte formed on a separator is indicated as a third electrolyte for the sake of convenience. However, all but at least one of the electrolytes may be the same electrolytes.

That is, as one specific example, at least one of the first electrolyte, the second electrolyte, and the third electrolyte may be a gel polymer electrolyte, and the other two electrolytes may be liquid electrolytes. In this case, the gel polymer electrolyte and the liquid electrolyte may independently have different ion conductivities.

Also, two of the first electrolyte, the second electrolyte, and the third electrolyte may be gel polymer electrolytes, and the other electrolyte may be a liquid electrolyte. In this case, the two gel polymer electrolytes may have different ion conductivities, and any one of them may have the same ion conductivity as the liquid electrolyte. Also, the two gel polymer electrolytes may have different ion conductivities, and the liquid electrolyte may also have different ion conductivity than the two gel polymer electrolytes. Also, the two gel polymer electrolytes may have the same ion conductivity, and the gel polymer electrolytes may have different ion conductivity than the liquid electrolyte.

In the present invention, the term "electrolyte complex" refers to a complex in which an electrolyte is applied onto or impregnated into a cathode, a separator, or an anode so that the electrolyte is integrated with the cathode, the separator, or the anode. In this case, the electrolyte may be a gel polymer electrolyte or a liquid electrolyte, and at least one or more of the cathode, the separator, and the anode may be formed of a gel polymer electrolyte.

In the present invention, term "different ion conductivities" means that electrolytes include any one or more selected from different types of solvents, different types of dissociable salts, and different concentrations of the dissociable salts, all of which constitute the electrolytes. More specifically, the different ion conductivities mean that a difference in ion conductivity is greater than or equal to 0.1 mS/cm. A method for measuring ion conductivity will be described in more detail in the following Examples.

In the present invention, the term "different types of solvents," "different types of salts," or "different concentrations of salts" may be determined by infrared spectroscopy. Specifically, when electrolytes including different types of solvents or different types of salts are applied or impregnated, a charge/discharge current is applied to separate a cathode, an anode, and a separator from an electrode assembly whose initial formation process is completed. Then, each of the cathode, the anode, and the separator are analyzed by Fourier transform infrared spectroscopy (670-IR, Varian) to distinguish between types or concentrations of the materials from the absorption spectra obtained by optically dividing reflected light when the materials are irradiated with infrared light, depending on the peak intensities derived from the material characteristics.

Also, the different types of the solvents, the different types of the salts, or the different concentrations of the salts may be determined by X-ray photoelectron spectroscopy, inductively coupled plasma mass spectrometry, nuclear magnetic resonance spectroscopy, time-of-flight secondary ion mass spectrometry, and the like, when necessary. A measuring method therefor will be described in more detail with reference to the following Examples.

Also, in the present invention, the term "gel polymer electrolyte" may be an electrolyte formed by applying a gel polymer electrolyte composition including a cross-linkable monomer, an initiator, a dissociable salt, and a solvent and curing the gel polymer electrolyte composition. The term "different types of solvents," "different types of salts," or "different concentrations of salts" means that different types of solvents, different types of salts, or different concentrations of salts are used in the gel polymer electrolyte composition.

Specifically, an aspect of the present invention relates to an electrochemical device, which includes:

- a cathode-electrolyte complex including a first electrolyte in a cathode,
- an anode-electrolyte complex including a second electrolyte in an anode, and
- a separator-electrolyte complex including a third electrolyte in a separator, wherein at least any one or more selected from the first electrolyte, the second electrolyte, and the third electrolyte are gel polymer electrolytes, and
- at least any one or more selected from the first electrolyte, the second electrolyte, and the third electrolyte have different ion conductivities.

According to an aspect of the present invention, one of the first electrolyte, the second electrolyte, and the third electrolyte may be a gel polymer electrolyte including a cross-linked polymer matrix, a solvent, and a dissociable salt, and the other two electrolytes may be liquid electrolytes including a solvent and a dissociable salt. In this case, the gel polymer electrolyte and the liquid electrolyte may have different ion conductivities. The ion conductivities may be different according to monomers included in the gel polymer electrolyte. Alternatively, the ion conductivities may be different according to the different types of solvents, the different types of dissociable salts, and different concentrations of the dissociable salts used in the gel polymer electrolyte and the liquid electrolyte.

According to an aspect of the present invention, two of the first electrolyte, the second electrolyte, and the third electrolyte may be gel polymer electrolytes including a cross-linked polymer matrix, a solvent, and a dissociable salt, and the other electrolyte may be a liquid electrolyte including a solvent and a dissociable salt. In this case, the two gel polymer electrolytes may be the same, or may include any one or more selected from different types of solvents, different types of dissociable salts, and different concentrations of the dissociable salts. Also, the gel polymer electrolyte and the liquid electrolyte may include any one or more selected from the different types of solvents, the different types of dissociable salts, and the different concentrations of the dissociable salts.

According to an aspect of the present invention, all of the first electrolyte, the second electrolyte, and the third electrolyte are gel polymer electrolytes including a cross-linked polymer matrix, a solvent, and a dissociable salt, and any one or more of the first electrolyte, the second electrolyte, and the third electrolyte may include any one or more selected from the different types of solvents, the different types of dissociable salts, and the different concentrations of the dissociable salts.

According to an aspect of the present invention, the cross-linked polymer matrix may have a semi-interpenetrating network (semi-IPN) structure because the cross-linked polymer matrix further includes a linear polymer.

According to an aspect of the present invention, a difference in ion conductivities between at least one or more selected from the first electrolyte, the second electrolyte, and the third electrolyte may be greater than or equal to 0.1 mS/cm.

According to an aspect of the present invention, at least any one or more selected from the first electrolyte, the second electrolyte, and the third electrolyte may have different slopes calculated at a temperature of 20 to 80° C. from an Arrhenius plot of the ion conductivities. Because the slope on the Arrhenius plot corresponds to activation energy with respect to the movement of ions in an electrolyte, the type of the solvent, the type of the salt, and the concentration of the salt may be determined from a difference in the slope.

According to an aspect of the present invention, any one or a mixed solvent of two or more selected from a carbonate-based solvent, a nitrile-based solvent, an ester-based solvent, an ether-based solvent, a glyme-based solvent, a ketone-based solvent, an alcohol-based solvent, an aprotic solvent, and water may be used as the type of the solvent.

According to an aspect of the present invention, the carbonate-based solvent may include any one or a mixture of two or more selected from dimethyl carbonate, diethyl carbonate, dipropyl carbonate, methylpropyl carbonate, ethylpropyl carbonate, methylethyl carbonate, ethylene carbonate, propylene carbonate, and butylene carbonate,

- the nitrile-based solvent may include any one or a mixture of two or more selected from acetonitrile, succinonitrile, adiponitrile, and sebaconitrile,
- the ester-based solvent may include any one or a mixture of two or more selected from methyl acetate, ethyl acetate, n-propyl acetate, 1,1-dimethylethyl acetate, methyl propionate, ethyl propionate, γ-butylolactone, decanolide, valerolactone, mevalonolactone, and caprolactone,
- the ether-based solvent may include any one or a mixture of two or more selected from dimethyl ether, dibutyl ether, tetraglyme, diglyme, dimethoxyethane, 2-methyltetrahydrofuran, and tetrahydrofuran,
- the glyme-based solvent may include any one or a mixture of two or more selected from ethylene glycol dimethylether, triethylene glycol dimethyl ether, and tetraethylene glycol dimethyl ether,
- the ketone-based solvent may be cyclohexanone,
- the alcohol-based solvent may include any one selected from ethyl alcohol and isopropyl alcohol, or a mixture thereof, and
- the aprotic solvent may include any one or a mixture of two or more selected from a nitrile-based solvent, an amide-based solvent, a dioxolane-based solvent, and a sulfolane-based solvent.

According to an aspect of the present invention, the dissociable salt may include any one or a mixture of two or more selected from lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bisoxalatoborate ($LiB(C_2O_4)_2$), lithium trifluoromethanesulfonyl imide ($LiN(C_xF_{2x+1}SO_2)(C_yF_{2y+1}SO_2)$) (wherein x and y are natural numbers), and derivatives thereof.

According to an aspect of the present invention, a difference in concentrations of the salts may be greater than or equal to 0.1 M.

According to an aspect of the present invention, the cathode may include a cathode active material layer, the anode may include an anode active material layer, and the cathode active material layer and the anode active material layer may include pores.

According to an aspect of the present invention, the cathode active material layer may have a porosity of 5 to 30% by volume, and the anode active material layer may have a porosity of 10 to 35% by volume.

According to an aspect of the present invention, the cathode active material layer may have a porosity of 10 to 20% by volume, and the anode active material layer may have a porosity of 15 to 25% by volume.

According to an aspect of the present invention, the cathode may include a cathode active material layer, the anode may include a lithium metal layer, and the cathode active material layer may include pores.

According to an aspect of the present invention, the cathode active material layer may have a porosity of 5 to 30% by volume.

According to an aspect of the present invention, the cathode active material layer may have a porosity of 10 to 20% by volume.

According to an aspect of the present invention, the electrochemical device may be a primary battery or a secondary battery in which an electrochemical reaction is likely to occur.

According to an aspect of the present invention, the primary battery or the secondary battery may include one selected from the group consisting of a lithium primary battery, a lithium secondary battery, a lithium-sulfur battery, a lithium-air battery, a sodium battery, an aluminum battery, a magnesium battery, a calcium battery, a zinc battery, a zinc-air battery, a sodium-air battery, an aluminum-air battery, a magnesium-air battery, a calcium-air battery, a super-capacitor, a dye-sensitized solar cell, a fuel cell, a lead storage battery, a nickel cadmium battery, a nickel hydrogen storage battery, and an alkaline battery.

Another aspect of the present invention is a first aspect of a method for manufacturing an electrochemical device, which includes:

a) applying a first gel polymer electrolyte composition onto a cathode and curing the first gel polymer electrolyte composition to manufacture a cathode-electrolyte complex including a first electrolyte;

b) stacking the cathode-electrolyte complex, a separator, and an anode to manufacture an electrode assembly; and c) sealing the electrode assembly with a packaging material, followed by injection of a liquid electrolyte, wherein the first electrolyte and the liquid electrolyte have different ion conductivities.

Still another aspect of the present invention is a second aspect of a method for manufacturing an electrochemical device, which includes:

a) applying a second gel polymer electrolyte composition onto an anode and curing the second gel polymer electrolyte composition to manufacture an anode-electrolyte complex including a second electrolyte;

b) stacking a cathode, a separator, and the anode-electrolyte complex to manufacture an electrode assembly; and c) sealing the electrode assembly with a packaging material, followed by injection of a liquid electrolyte, wherein the second electrolyte and the liquid electrolyte have different ion conductivities.

Yet another aspect of the present invention is a third aspect of a method for manufacturing an electrochemical device, which includes:

a) applying a third gel polymer electrolyte composition onto a separator and curing the third gel polymer electrolyte composition to manufacture a separator-electrolyte complex including a third electrolyte;

b) stacking a cathode, the separator-electrolyte complex, and an anode to manufacture an electrode assembly; and c) sealing the electrode assembly with a packaging material, followed by injection of a liquid electrolyte, wherein the third electrolyte and the liquid electrolyte have different ion conductivities.

Yet another aspect of the present invention is a fourth aspect of a method for manufacturing an electrochemical device, which includes:

a) applying a first gel polymer electrolyte composition onto a cathode and curing the first gel polymer electrolyte composition to manufacture a cathode-electrolyte complex including a first electrolyte, and applying a second gel polymer electrolyte composition onto an anode and curing the second gel polymer electrolyte composition to manufacture an anode-electrolyte complex including a second electrolyte;

b) stacking the cathode-electrolyte complex, a separator, and the anode-electrolyte complex to manufacture an electrode assembly; and c) sealing the electrode assembly with a packaging material, followed by injection of a liquid electrolyte, wherein at least any one or more selected from the first electrolyte, the second electrolyte, and the liquid electrolyte have different ion conductivities.

Yet another aspect of the present invention is a fifth aspect of a method for manufacturing an electrochemical device, which includes:

a) applying a first gel polymer electrolyte composition onto a cathode and curing the first gel polymer electrolyte composition to manufacture a cathode-electrolyte complex including a first electrolyte, and applying a third gel polymer electrolyte composition onto a separator and curing the third gel polymer electrolyte composition to manufacture a separator-electrolyte complex including a third electrolyte;

b) stacking the cathode-electrolyte complex, the separator-electrolyte complex, and an anode to manufacture an electrode assembly; and c) sealing the electrode assembly with a packaging material, followed by injection of a liquid electrolyte, wherein at least any one or more selected from the first electrolyte, the third electrolyte, and the liquid electrolyte have different ion conductivities.

Yet another aspect of the present invention is a sixth aspect of a method for manufacturing an electrochemical device, which includes:

a) applying a second gel polymer electrolyte composition onto an anode and curing the second gel polymer electrolyte composition to manufacture an anode-electrolyte complex including a second electrolyte, and applying a third gel polymer electrolyte composition onto a separator and curing the third gel polymer electrolyte composition to manufacture a separator-electrolyte complex including a third electrolyte;

b) stacking a cathode, the separator-electrolyte complex, and the anode-electrolyte complex to manufacture an electrode assembly; and c) sealing the electrode assembly with a packaging material, followed by injection of a liquid electrolyte, wherein at least any one or more selected from the second electrolyte, the third electrolyte, and the liquid electrolyte have different ion conductivities.

In an aspect of the method for manufacturing an electrochemical device according to the present invention, step b) may be selected from the following steps:

b-1) stacking the cathode or the cathode-electrolyte complex, the separator or the separator-electrolyte complex, and the anode or the anode-electrolyte complex and cutting the stacked body into a certain shape to manufacture an electrode assembly; or b-2) cutting each of the cathode or the cathode-electrolyte complex, the separator or the separator-electrolyte complex, and the anode or the anode-electrolyte complex into a certain shape, and stacking the cut electrodes or electrolyte complexes to manufacture an electrode assembly.

In an aspect of the method for manufacturing an electrochemical device according to the present invention, at least any one or more selected from the first electrolyte, the second electrolyte, the third electrolyte, and the liquid electrolyte may include any one or more selected from different types of solvents, different types of dissociable salts, and different concentrations of the dissociable salts.

Yet another aspect of the present invention is a seventh aspect of a method for manufacturing an electrochemical device, which includes:

i) applying a first gel polymer electrolyte composition onto a cathode and curing the first gel polymer electrolyte composition to manufacture a cathode-electrolyte complex including a first electrolyte, applying a second gel polymer electrolyte composition onto an anode and curing the second gel polymer electrolyte composition to manufacture an anode-electrolyte complex including a second electrolyte, and applying a third gel polymer electrolyte composition onto a separator and curing the third gel polymer electrolyte composition to manufacture a separator-electrolyte complex including a third electrolyte; and ii) stacking the cathode-electrolyte complex, the separator-electrolyte complex, and the anode-electrolyte complex to manufacture an electrode assembly;

wherein at least any one or more selected from the first electrolyte, the second electrolyte, and the third electrolyte have different ion conductivities.

In an aspect of the method for manufacturing an electrochemical device, at least any one or more selected from the first electrolyte, the second electrolyte, and the third electrolyte may include any one or more selected from different types of solvents, different types of dissociable salts, and different concentrations of the dissociable salts.

In an aspect of the method for manufacturing an electrochemical device, step ii) may be selected from the following steps:

ii-1) stacking the cathode-electrolyte complex, the separator-electrolyte complex, and the anode-electrolyte complex and cutting the stacked body into a certain shape; or ii-2) cutting each of the cathode-electrolyte complex, the separator-electrolyte complex, and the anode-electrolyte complex into a certain shape, and stacking the cut electrodes or electrolyte complexes.

In an aspect of the method for manufacturing an electrochemical device, the method may further include iii) sealing the electrode assembly with a packaging material after step ii).

Hereinafter, an aspect of the present invention will be described in more detail.

First, an electrochemical device according to an aspect of the present invention will be described in more detail.

The electrochemical device according to an aspect of the present invention includes a cathode-electrolyte complex including a first electrolyte in a cathode, an anode-electrolyte complex including a second electrolyte in an anode, and a separator-electrolyte complex including a third electrolyte in a separator.

In this case, at least any one or more selected from the first electrolyte, the second electrolyte, and the third electrolyte are gel polymer electrolyte, and at least any one or more selected from the first electrolyte, the second electrolyte, and the third electrolyte have different ion conductivities.

Specifically, in the first aspect of the electrochemical device according to the present invention, one of the first electrolyte, the second electrolyte, and the third electrolyte may be a gel polymer electrolyte including a cross-linked polymer matrix, a solvent, and a dissociable salt, and the other two electrolytes may be liquid electrolytes including a solvent and a dissociable salt. In this case, the gel polymer electrolyte and the liquid electrolyte may have different ion conductivities. More specifically, the gel polymer electrolyte and the liquid electrolyte may include any one or more selected from different types of solvents, different types of dissociable salts, and different concentrations of the dissociable salts.

As a more specific example of the first aspect, the first electrolyte may be a gel polymer electrolyte, and the second electrolyte and the third electrolyte may be liquid electrolytes. Also, the first electrolyte as the gel polymer electrolyte may have different ion conductivity than the second electrolyte and the third electrolyte as the liquid electrolytes. In this case, the second electrolyte and the third electrolyte as the liquid electrolytes may be the same as each other.

Alternatively, the second electrolyte may be a gel polymer electrolyte, and the first electrolyte and the third electrolyte may be liquid electrolytes. Also, the second electrolyte as the gel polymer electrolyte may have different ion conductivity than the first electrolyte and the third electrolyte as the liquid electrolytes. In this case, the first electrolyte and the third electrolyte as the liquid electrolytes may be the same as each other.

Alternatively, the third electrolyte may be a gel polymer electrolyte, and the first electrolyte and the second electrolyte may be liquid electrolytes. Also, the third electrolyte as the gel polymer electrolyte may have different ion conductivity than the first electrolyte and the second electrolyte as the liquid electrolytes. In this case, the first electrolyte and the second electrolyte as the liquid electrolytes may be the same as each other.

In the second aspect of the electrochemical device according to the present invention, two of the first electrolyte, the second electrolyte, and the third electrolyte may be gel polymer electrolytes including a cross-linked polymer matrix, a solvent, and a dissociable salt, and the other electrolyte may be a liquid electrolyte including a solvent and a dissociable salt. In this case, the two gel polymer electrolytes may have the same ion conductivity, and the gel polymer electrolyte and the liquid electrolyte may have different ion conductivities. Alternatively, the two gel polymer electrolytes may have different ion conductivities, and any one of the two gel polymer electrolytes may have the same ion conductivity as the liquid electrolyte. Alternatively, the two gel polymer electrolytes may have different ion conductivities, and the liquid electrolyte may also have different ion conductivity than the two gel polymer electrolytes.

As a more specific example of the second aspect, the first electrolyte and the second electrolyte may be gel polymer electrolytes, and the third electrolyte may be a liquid electrolyte. In this case, the first electrolyte as the gel polymer electrolyte and the second electrolyte as the gel polymer electrolyte may have different ion conductivities, and the third electrolyte as the liquid electrolyte may also have different ion conductivity than the first electrolyte and the second electrolyte.

Alternatively, the first electrolyte and the second electrolyte may be gel polymer electrolytes, and the third electrolyte may be a liquid electrolyte. In this case, the first electrolyte as the gel polymer electrolyte and the second electrolyte as the gel polymer electrolyte may have different ion conductivities, and the third electrolyte as the liquid electrolyte may have the same ion conductivity as any one of the first electrolyte and the second electrolyte.

Alternatively, the first electrolyte and the second electrolyte may be gel polymer electrolytes, and the third electrolyte may be a liquid electrolyte. In this case, the first electrolyte as the gel polymer electrolyte and the second electrolyte as the gel polymer electrolyte may have the same ion conductivity, and the third electrolyte as the liquid electrolyte may have different ion conductivity than the first electrolyte and the second electrolyte.

As in the above-described second aspect, when the electrochemical device has two gel polymer electrolytes and the two gel polymer electrolytes have different ion conductivities, the two gel polymer electrolytes may include any one or more selected from different types of solvents, different types of dissociable salts, and different concentrations of the dissociable salts.

Also, when the gel polymer electrolyte and the liquid electrolyte have different ion conductivities, the gel polymer electrolyte and the liquid electrolyte may include any one or more selected from different types of solvents, different types of dissociable salts, and different concentrations of the dissociable salts.

In the third aspect of the electrochemical device according to the present invention, all of the first electrolyte, the second electrolyte, and the third electrolyte are gel polymer electrolytes including a cross-linked polymer matrix, a solvent, and a dissociable salt, and any one or more of the first electrolyte, the second electrolyte, and the third electrolyte may include any one or more selected from the different types of solvents, the different types of dissociable salts, and the different concentrations of the dissociable salts.

As a more specific example of the third aspect, all of the first electrolyte, the second electrolyte, and the third electrolyte may be gel polymer electrolytes, and the ion conductivity of the first electrolyte may different from the ion conductivities of the second electrolyte and the third electrolyte.

Alternatively, all of the first electrolyte, the second electrolyte, and the third electrolyte may be gel polymer electrolytes, and the ion conductivity of the second electrolyte may be different from the ion conductivities of the first electrolyte and the third electrolyte.

Alternatively, all of the first electrolyte, the second electrolyte, and the third electrolyte may be gel polymer electrolytes, and the ion conductivity of the third electrolyte may be different from the ion conductivities of the first electrolyte and the second electrolyte.

Alternatively, all of the first electrolyte, the second electrolyte, and the third electrolyte may be gel polymer electrolytes, and the ion conductivities of all of the first electrolyte, the second electrolyte, and the third electrolyte may be different from each other.

The respective aspects as described above are illustrative only to describe an aspect of the present invention in detail. However, it is apparent that the disclosure of the present invention is not intended to limit the first to third aspects of the present invention, and may be embodied in various forms with reference to the first to third aspects of the present invention.

In the first to third aspects, a difference in ion conductivities between the gel polymer electrolytes is due to the fact that the gel polymer electrolyte of the present invention may be applied using an application method, and cured to form a gel polymer electrolyte. Also, the difference in ion conductivities between the electrolytes may be achieved when the electrolytes include any one or more selected from different types of solvents, different types of dissociable salts, and different concentrations of the dissociable salts.

In an aspect of the present invention, the first electrolyte, the second electrolyte, and the third electrolyte may be gel polymer electrolytes or liquid electrolytes, and at least one or more of the first electrolyte, the second electrolyte, and the third electrolyte may be gel polymer electrolytes.

Also, at least any one or more of the first electrolyte, the second electrolyte, and the third electrolyte may have different ion conductivities. More specifically, a difference in ion conductivities between the first electrolyte, the second electrolyte, and the third electrolyte may be greater than or equal to 0.1 mS/cm. When the difference in ion conductivities is greater than or equal to 0.1 mS/cm, the charge/discharge efficiency and battery lifespan may be enhanced, and an improvement in battery safety may be promoted as well.

In addition, at least any one or more selected from the first electrolyte, the second electrolyte, and the third electrolyte is characterized by having different slopes calculated at a temperature of 20 to 80° C. from an Arrhenius plot of the ion conductivities. When the Arrhenius plot has different slopes, the charge/discharge efficiency and battery lifespan may be enhanced, and an improvement in battery safety may be promoted as well.

Liquid electrolytes are not limited as long as they are commonly used as the liquid electrolyte in the related art. As a specific example, the liquid electrolyte may include a solvent and a dissociable salt.

As a specific example, the gel polymer electrolyte may also include a cross-linked polymer matrix, a solvent, and a dissociable salt. The gel polymer electrolyte may be continuously produced by applying a gel polymer electrolyte composition using coating methods such as bar coating, spin coating, slot die coating, dip coating, spray coating, and the like, as well as printing methods such as ink-jet printing, gravure printing, gravure offset, aerosol printing, stencil printing, screen printing, and the like.

The gel polymer electrolyte may be an electrolyte in which a cross-linkable monomer and derivatives thereof are optically or thermally cross-linked by an initiator to form a cross-linked polymer matrix. Specifically, a gel polymer electrolyte composition including a cross-linkable monomer and derivatives thereof, an initiator, a solvent, and a dissociable salt may be coated and cross-linked by ultraviolet irradiation or heating so that a liquid electrolyte including a solvent and a dissociable salt can be uniformly distributed in a network structure of a cross-linked polymer matrix. In this case, a solvent evaporation process may not be required.

The gel polymer electrolyte composition preferably has a viscosity suitable for a printing process. As a specific example, the gel polymer electrolyte composition has a viscosity of 0.1 to 10,000,000 cps, more desirably 1.0 to 1,000,000 cps, and more preferably 1.0 to 100,000 cps, as measured at 25° C. using a Brookfield viscometer. It is desirable in that the gel polymer electrolyte composition has a viscosity suitable for use in the printing process when the viscosity of the composition falls within the above range, but the present invention is not limited thereto.

The gel polymer electrolyte composition may include 1 to 50% by weight, specifically, 2 to 40% by weight, of the cross-linkable monomer and derivatives thereof, based on a total of 100% by weight of the composition, but the present invention is not limited thereto. The initiator may be included at 0.01 to 50% by weight, specifically 0.01 to 20% by weight, and more specifically 0.1 to 10% by weight, but the present invention is not limited thereto. The liquid electrolyte with which the solvent, dissociable salt is mixed may be included at 1 to 95% by weight, specifically 1 to 90% by weight, and more specifically 2 to 80% by weight, but the present invention is not limited thereto.

A monomer having two or more functional groups, or a mixture obtained by mixing a monomer having one functional group with a monomer having two or more functional groups may be used as the cross-linkable monomer. In this case, optically or thermally cross-linkable monomers may be used without any limitation. More specifically, the cross-linkable monomer may include any one or a mixture of two or more selected from the group consisting of an acrylate-based monomer, an acrylic acid-based monomer, a sulfonic acid-based monomer, a phosphoric acid-based monomer, a perfluorinated monomer, an acrylonitrile-based monomer, and the like.

As a specific example, the monomer having two or more functional groups may include any one or a mixture of two or more selected from polyethylene glycol diacrylate, polyethylene glycol dimethacrylate, triethylene glycol diacrylate, triethylene glycol dimethacrylate, trimethylolpropane ethoxylate triacrylate, trimethylolpropane ethoxylate trimethacrylate, bisphenol A ethoxylate diacrylate, bisphenol A ethoxylate dimethacrylate, and the like.

Also, the monomer having one functional group may include any one or a mixture of two or more selected from methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, vinyl fluoride, and the like.

More specifically, trimethylolpropane ethoxylate triacrylate may be used alone, or a mixture obtained by mixing any one or more selected from the monomer having two or more functional groups and the monomer having one functional group with the trimethylolpropane ethoxylate triacrylate may be used as the monomer.

Photoinitiators or thermal initiators may be used as the initiator without any limitation as long as they are commonly used in the art.

The liquid electrolyte refers to an electrolyte including a dissociable salt and a solvent.

As a specific example, the dissociable salt may include any one or a mixture of two or more selected from lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bisoxalatoborate ($LiB(C_2O_4)_2$), lithium trifluoromethanesulfonyl imide ($LiN(C_xF_{2x+1}SO_2)$ $(C_yF_{2y+1}SO_2)$ (wherein x and y are natural numbers), and derivatives thereof, but the present invention is not limited thereto. A concentration of the dissociable salt may be in a range of 0.1 to 10.0 M, more specifically in a range of 1 to 5 M, but the present invention is not limited thereto.

More specifically, the dissociable salt may include any one or a mixture of two or more selected from lithium hexafluorophosphate, lithium bisoxalatoborate, lithium trifluoromethanesulfonyl imide, and derivatives thereof.

Any one or a mixed solvent of two or more selected from organic solvents such as a carbonate-based solvent, a nitrile-based solvent, an ester-based solvent, an ether-based solvent, a ketone-based solvent, a glyme-based solvent, an alcohol-based solvent, an aprotic solvent, and the like, and water may be used as the solvent.

Dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like may be used as the carbonate-based solvent.

Acetonitrile, succinonitrile, adiponitrile, sebaconitrile, and the like may be used as the nitrile-based solvent.

Methyl acetate, ethyl acetate, n-propyl acetate, 1,1-dimethyl ethyl acetate, methyl propionate, ethyl propionate, γ-butylolactone, decanolide, valerolactone, mevalonolactone, caprolactone, and the like may be used as the ester-based solvent.

Dimethyl ether, dibutyl ether, tetraglyme, diglyme, dimethoxyethane, 2-methyltetrahydrofuran, tetrahydrofuran, and the like may be used as the ether-based solvent, and cyclohexanone, and the like may be used as the ketone-based solvent.

Ethylene glycol dimethylether, triethylene glycol dimethyl ether, tetraethylene glycol dimethyl ether, and the like may be used as the glyme-based solvent.

Ethyl alcohol, isopropyl alcohol, and the like may be used as the alcohol-based solvent, and nitriles such as R—CN (wherein R is a hydrocarbon group having a C2 to C20 linear, branched, or cyclic structure, and may include a double-bond aromatic ring or an ether bond) and the like, amides such as dimethyl formamide and the like, dioxolanes such as 1,3-dioxolane and the like, sulfolanes, and the like may be used as the aprotic solvent.

The solvents may be used alone or in combination of one or more thereof. When one or more solvents are mixed and used, a mixing ratio of the solvents may be properly adjusted according to the desired battery performance, which may be well understood by those skilled in the art.

More specifically, the solvent may include any one or a mixture of two or more selected from dimethyl carbonate, ethylene carbonate, propylene carbonate, methylpropyl carbonate, methylethyl carbonate, succinonitrile, 1,3-dioxolane, dimethylacetamide, sulfolane, tetraethylene glycol dimethyl ether, dimethoxyethane, and the like.

Also, the cross-linked polymer matrix may have a semi-interpenetrating network (semi-IPN) structure because the cross-linked polymer matrix further includes a linear polymer. In this case, batteries may be normally driven without any performance degradation because the cross-linked polymer matrix has excellent flexibility, and exhibits strong resistance to stress such as bending and the like when used in the batteries. Therefore, the cross-linked polymer matrix may be applied to flexible batteries, and the like.

Polymers may be used as the linear polymer without any limitation as long as they can be easily mixed with the cross-linkable monomer and can be impregnated with a liquid electrolyte. As a specific example, the linear polymer may include any one or a combination of two or more selected from poly(vinylidene fluoride) (PVdF), poly(vinylidene fluoride)-co-hexafluoropropylene (PVdF-co-HFP), polymethylmethacrylate (PMMA), polystyrene (PS), polyvinyl acetate (PVA), polyacrylonitrile (PAN), polyethylene oxide (PEO), and the like, but the present invention is not particularly limited thereto.

The linear polymer may be included at 1 to 90% by weight, based on the weight of the cross-linked polymer matrix. Specifically, the linear polymer may be included at 1 to 80% by weight, 1 to 70% by weight, 1 to 60% by weight, 1 to 50% by weight, 1 to 40% by weight, or 1 to 30% by weight. That is, when the polymer matrix has a semi-interpenetrating network (semi-IPN) structure, the cross-linkable polymer and the linear polymer may be included at a weight ratio ranging from 99:1 to 10:90. When the linear polymer is included within the above range, the cross-linked polymer matrix may secure flexibility while maintaining proper mechanical strength. Therefore, when the linear polymer is applied to flexible batteries, stable battery performance may be achieved even when the battery shape is deformed by various external forces, and risks of battery ignition, explosion, and the like, which may be caused due to the deformed shape of the battery, may be suppressed.

Also, the gel polymer electrolyte composition may further include inorganic particles, when necessary. The inorganic particles may be applied to enable printing of the gel polymer electrolyte composition by controlling the rheological characteristics (such as viscosity and the like) of the gel polymer electrolyte composition.

The inorganic particles may be used to improve ion conductivity of the electrolyte and improve mechanical strength. In this case, the inorganic particles may be porous particles, but the present invention is not limited thereto. For example, metal oxides, carbon oxides, carbon-based materials, organic/inorganic composites, and the like may be used, for example, may be used alone or in a combination of two or more. More specifically, the inorganic particles may, for example, include any one or a mixture of two or more selected from $SiO_2$, $Al_2O_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $SrTiO_3$, $SnO_2$, $CeO_2$, MgO, NiO, CaO, ZnO, $ZrO_2$, SiC, and the like. When the inorganic particles are used, the inorganic particles may have high affinity for organic solvents and may also be highly thermally stable, thereby improving thermal stability of the electrochemical device, but the present invention is not limited thereto.

The inorganic particles may have an average diameter of 0.001 μm to 10 μm, but the present invention is not limited thereto. Specifically, the diameter of the inorganic particles may be in a range of 0.1 to 10 μm, more specifically in a range of 0.1 to 5 μm. When the average diameter of the inorganic particles satisfies the above range, excellent mechanical strength and stability of the electrochemical device may be achieved.

In the gel polymer electrolyte composition, the inorganic particles may be included at a content of 1 to 50% by weight, more specifically 5 to 40% by weight, and more specifically 10 to 30% by weight. In this case, the inorganic particles may be used at a content satisfying the viscosity range as previously described above, that is, a viscosity range of 0.1 to 10,000,000 cps, more desirably 1.0 to 1,000,000 cps, and more preferably 1.0 to 100,000 cps, but the present invention is not limited thereto.

(1) Cathode-Electrolyte Complex

According to an aspect of the present invention, the cathode refers to an electrode in which a cathode active material layer is formed on a positive current collector.

Substrates having excellent conductivity used in the related art are used as the positive current collector without any limitation. In this case, the positive current collector may be configured to include any one selected from a conductive metal, a conductive metal oxide, and the like. Also, the current collector may be in a form in which the entire substrate is formed of a conductive material or one or both surfaces of an insulating substrate are coated with a conductive metal, a conductive metal oxide, a conductive polymer, and the like. In addition, the current collector may be composed of a flexible substrate. Accordingly, a flexible electronic device may be provided because the current collector is easily bent. Also, the current collector may be formed of a material having a restoring force by which it returns to an original shape after it is bent. More specifically, the current collector may be formed of a polymer base and the like, which are coated with aluminum, stainless steel, copper, nickel, iron, lithium, cobalt, titanium, a nickel foam, a copper foam, and a conductive metal, but the present invention is not limited thereto.

The cathode active material layer may be formed as an active material layer including a cathode active material and a binder.

A thickness of the cathode active material layer is not limited, but may be in a range of 0.01 to 500 μm, more specifically in a range of 1 to 200 μm, but the present invention is not limited thereto.

In the cathode active material layer, the active material layer may be formed by applying a cathode active material composition including a cathode active material, a binder, and a solvent. Alternatively, a film obtained by casting the cathode active material composition onto a separate support and then peeling the cast composition from the support may be laminated onto the current collector to manufacture a cathode on which a cathode active material layer is formed.

Cathode active materials may be used as the cathode active material without any limitation as long as they are commonly used in the related art. Specifically, a compound (a lithiated intercalation compound) enabling reversible intercalation and deintercalation of lithium ions may be used in the case of lithium primary batteries or secondary batteries. The cathode active material of the present invention may be in the form of powder.

Specifically, one or more of composite oxides of lithium and a metal, which includes any one or a combination of two or more selected from cobalt, manganese, nickel, and the like, may be used. A compound represented by any one of the following formulas may be used as a specific example, but the present invention is not limited thereto: LiaA1-bRbD2 (wherein 0.90≤a≤1.8, and 0≤b≤0.5); LiaE1-bRbO2-cDc (wherein 0.90≤a≤1.8, 0≤b≤0.5, and 0≤c≤0.05); LiE2-bRbO4-cDc (wherein 0≤b≤0.5, and 0≤c≤0.05); LiaNil-b-cCobRcDα (wherein 0.90≤a≤1.8, 0≤b≤0.5, 0≤c≤0.05, and 0<α≤2); LiaNi1-b-cCobRcO2-αZα (wherein 0.90≤a≤1.8, 0≤b≤0.5, 0≤c≤0.05, and 0<α≤2); LiaNil-b-cCobRcO2-αZ2 (wherein 0.90≤a≤1.8, 0≤b≤0.5, 0≤c≤0.05, and 0<α<2); LiaNi1-b-cMnbRcDα (wherein 0.90≤a≤1.8, 0≤b≤0.5, 0≤c≤0.05, and 0<α≤2); LiaNi1-b-cMnbRcO2-αZα (wherein 0.90≤a≤1.8, 0≤b≤0.5, 0≤c≤0.05, and 0<α<2); LiaNi1-b-cMnbRcO2-αZ2 (wherein 0.90≤a≤1.8, 0≤b≤0.5, 0≤c≤0.05, and 0<α<2); LiaNibEcGdO2 (wherein 0.90≤a≤1.8, 0≤b≤0.9, 0≤c≤0.5, and 0.001≤d≤0.1); LiaNibCocMndGeO2 (wherein 0.90≤a≤1.8, 0≤b≤0.9, 0≤c≤0.5, 0≤d≤0.5, and 0.001≤e≤0.1); LiaNiGbO2 (wherein 0.90≤a≤1.8, and 0.001≤b≤0.1); LiaCoGbO2 (wherein 0.90≤a≤1.8, and 0.001≤b≤0.1); LiaMnGbO2 (wherein 0.90≤a≤1.8, and 0.001≤b≤0.1); LiaMn2GbO4 (wherein 0.90≤a≤1.8, and 0.001≤b≤0.1); Q02; QS2; LiQS2; V2O5; LiV2O5; LiTO2; LiNiVO4; Li(3-f)J2(PO4)3 (0≤f≤2); Li(3-f)Fe2(PO4)3 (0≤f≤2); and LiFePO4.

In the formulas, A is Ni, Co, Mn, or a combination thereof; R is Al, Ni, Co, Mn, Cr, Fe, Mg, Sr, V, a rare-earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

Of course, the compound having a coating layer formed on a surface thereof may be used, or the compound may also be used after the compound is mixed with a compound having a coating layer. The coating layer may include an oxide of a coating element, a hydroxide of a coating element, oxyhydroxide of a coating element, oxycarbonate of a coating element, or hydroxidecarbonate of a coating element as a coating element compound. Compounds constituting these coating layers may be amorphous or crystalline. Mg, Al, Co, K, Na, Ca, Si, Ti, V, Sn, Ge, Ga, B, As, Zr, or a mixture thereof may be used as the coating element included in the coating layer. In the case of a process for forming a coating layer, any coating method may be used as long as the compound may be coated with these elements using a method that does not have an adverse effect on the physical properties of the cathode active material, for example, a spray coating method, a dipping method, or the like. In this case, the contents of the coating methods may be well understood by those skilled in the related art, and thus a detailed description thereof will be omitted.

The cathode active material may be included at 20 to 99% by weight, more desirably 30 to 95% by weight, based on the total weight of the composition, but the present invention is not limited thereto. Also, an average particle size of the cathode active material may be in a range of 0.001 to 50 μm, more desirably in a range of 0.01 to 20 μm, but the present invention is not limited thereto.

The binder serves to tightly attach cathode active material particles to each other, and also serves to fix a cathode active material in a current collector. Binders commonly used in the related art may be used without any limitation. Representative examples of the binder may include polyvinyl alcohol, carboxymethyl cellulose, hydroxypropyl cellulose, polyvinyl chloride, carboxylated polyvinyl chloride, polyvinyl fluoride, a polymer including ethylene oxide, polyvinylpyrrolidone, polyurethane, polytetrafluoroethylene, poly (vinylidene fluoride), polyethylene, polypropylene, a styrene-butadiene rubber, an acrylated styrene-butadiene rubber, an epoxy resin, nylon, and the like, which may be used alone or in combination of two or more thereof, but the present invention is not limited thereto. The binder may be used at a content of 0.1 to 20% by weight, more desirably a content of 1 to 10% by weight, based on the total weight of the composition, but the present invention is not limited thereto. The binder plays its sufficient role within the above content range, but the present invention is not limited thereto.

Any one or a mixed solvent of two or more selected from N-methyl pyrrolidone, acetone, water, and the like may be used as the solvent, but the present invention is not limited thereto. Solvents commonly used in the related art may be used. A content of the solvent is not limited, and the solvent may be used without any limitation as long as the solvent is present at a sufficient content to apply it onto a positive current collector in a slurry state.

Also, the cathode active material composition may further include a conductive material.

The conductive material is used to impart conductivity to electrodes. In a configured battery, conductive materials may be used without any limitation as long as they do not cause a chemical change and are electronically conductive. As a specific example, conductive materials including carbon-based materials such as natural graphite, artificial graphite, carbon black, acetylene black, ketjen black, carbon nanotubes, carbon fibers, and the like; metal-based materials such as metal powder or metal fibers, for example, copper, nickel, aluminum, silver, and the like; conductive polymers such as polyphenylene derivatives and the like; or a mixture thereof may be used. In this case, the conductive materials may be used alone or in a combination of two or more.

A content of the conductive material may be included at 0.1 to 20% by weight, more specifically 0.5 to 10% by weight, and more specifically 1 to 5% by weight, in the cathode active material composition, but the present invention is not limited thereto. Also, the conductive material may have an average particle size of 0.001 to 1,000 μm, more specifically 0.01 to 100 μm, but the present invention is not limited thereto.

According to an aspect of the present invention, the cathode active material layer may include pores, and may have a porosity of 5 to 30% by volume, more specifically a porosity of 10 to 20% by volume, but the present invention is not limited thereto. When a liquid electrolyte or a gel polymer electrolyte is injected so that the porosity of the cathode active material layer falls within the above range, the cathode active material layer has a drawback in that it may be difficult to impregnate the electrolyte into the central region of a battery because the cathode active material layer has low porosity. However, in an aspect of the present invention, the gel polymer electrolyte may be applied to form a gel polymer electrolyte layer. Therefore, an even and uniformly impregnated electrolyte layer may be formed even when the porosity of the cathode active material layer is low.

According to an aspect of the present invention, the cathode-electrolyte complex refers to a complex in which the liquid electrolyte or the gel polymer electrolyte is stacked onto or impregnated into a cathode so that the liquid electrolyte or the gel polymer electrolyte is integrated with the cathode. The impregnation refers to a process in which some or all of the electrolyte is penetrated so that the electrolyte is integrated with the cathode.

In the cathode-electrolyte complex, when the first electrolyte is a gel polymer electrolyte, the gel polymer electrolyte layer may have a thickness of 0.01 μm to 500 μm. Specifically, the gel polymer electrolyte layer may have a thickness of 0.01 to 100 μm, but the present invention is not limited thereto. When the thickness of the gel polymer electrolyte layer satisfies the above thickness range, the ease in manufacturing process may be promoted while improving the performance of the electrochemical device.

(2) Anode-Electrolyte Complex

According to an aspect of the present invention, the anode may be formed according to various aspects. As a specific example, the anode may be selected from i) an electrode composed solely of a current collector, and ii) an electrode in which a current collector is coated with an active material layer including an anode active material and a binder.

The negative current collector may be in the form of a thin film or mesh, and a material of the negative current collector may be composed of a metal (such as a lithium metal, a lithium-aluminum alloy, other lithium metal alloys, and the like), a polymer, or the like. In the anode of the present invention, the current collector in the form of a thin film or mesh may be used as it is, or the current collector in the form of a thin film or mesh may be stacked onto a conductive substrate so that the current collector may be integrated with the conductive substrate.

Also, substrates having excellent conductivity used in the related art may be used as the current collector without any limitation. As a specific example, the current collector may be confirmed to include any one selected from a conductive metal, a conductive metal oxide, and the like. Also, the current collector may be in a form in which the entire substrate is formed of a conductive material or one or both surfaces of an insulating substrate are coated with a conductive metal, a conductive metal oxide, a conductive polymer, and the like. In addition, the current collector may be composed of a flexible substrate. Accordingly, a flexible electronic device may be provided because the current collector is easily bent. Also, the current collector may be formed of a material having a restoring force by which it returns to an original shape after it is bent. More specifically, the current collector may, for example, be formed of a polymer base and the like, which are coated with aluminum, stainless steel, copper, nickel, iron, lithium, cobalt, titanium, a nickel foam, a copper foam, and a conductive metal, but the present invention is not limited thereto ii) An aspect of the anode according to the present invention may be an anode in which an anode active material composition including an anode active material and a binder is applied onto a current collector so that an active material layer is coated with the composition. The current collector is as previously described above, and the anode active material composition may be directly coated onto a current collector (such as a metal thin film, and the like), and dried to form a negative electrode plate on which an anode active material layer is formed.

Alternatively, a film obtained by casting the anode active material composition onto a separate support and then peeling the cast composition from the support may be laminated onto the current collector to manufacture an anode on which an anode active material layer is formed. A thickness of the anode active material layer is not limited, but may be in a range of 0.01 to 500 μm, more specifically in a range of 0.1 to 200 μm, but the present invention is not limited thereto.

The anode active material composition is not limited, but may include an anode active material, a binder, and a solvent, and may further include a conductive material.

Anode active materials may be used as the anode active material without any limitation as long as they are commonly used in the related art. Specifically, a compound (a lithiated intercalation compound) enabling reversible intercalation and deintercalation of lithium ions may be used in the case of lithium primary batteries or secondary batteries. The anode active material of the present invention may be in the form of powder.

As a more specific example, the anode active material of the present invention may include any one or a mixture of two or more selected from a metal alloyable with lithium, a transition metal oxide, a non-transition metal oxide, a carbon-based material, and the like.

Na, K, Rb, Cs, Fr, Be, Mg, Ca, Sr, Si, Sb, Pb, In, Zn, Ba, Ra, Ge, Al, Sn, and the like may be used as the metal alloyable with lithium, but the present invention is not limited thereto.

The transition metal oxide may include lithium titanium oxide, vanadium oxide, lithium vanadium oxide, and the like, which may be used alone or in mixture of two or more thereof.

The non-transition metal oxide may include Si, SiOx ($0<x<2$), a Si—C composite, a Si-Q alloy (wherein Q is an alkali metal, an alkaline earth metal, Group 13 to Group 16 elements, a transition metal, a rare-earth element, or a combination thereof, and is not Si), Sn, $SnO_2$, a Sn—C composite, Sn—R (wherein R is an alkali metal, an alkaline earth metal, Group 13 to Group 16 elements, a transition metal, a rare-earth element, or a combination thereof, and is not Si), and the like. Specific elements of Q and R may include any one or a mixture of two or more selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and the like.

Any one or a mixture of two or more selected from crystalline carbon, amorphous carbon, and a combination thereof may be used as the carbon-based material. Examples of the crystalline carbon that may be used may include graphite such as amorphous, platy, flake, spherical, or fibrous natural graphite, artificial graphite, and the like, and examples of the amorphous carbon that may be used may include soft carbon, hard carbon, mesophase pitch carbide, calcined coke, and the like, but the present invention is not limited thereto.

The anode active material may be included at 1 to 90% by weight, more desirably 5 to 80% by weight, based on the total weight of the composition, but the present invention is not limited thereto. Also, the anode active material may have an average particle size of 0.001 to 20 μm, more desirably 0.01 to 15 μm, but the present invention is not limited thereto.

The binder serves to tightly attach anode active material particles to each other, and also serves to fix an anode active material in a current collector. Binders commonly used in the related art may be used without any limitation. Representative examples of the binder may include polyvinyl alcohol, carboxymethyl cellulose, hydroxypropyl cellulose, polyvinyl chloride, carboxylated polyvinyl chloride, polyvinyl fluoride, a polymer including ethylene oxide, polyvinylpyrrolidone, polyurethane, polytetrafluoroethylene, poly (vinylidene fluoride), polyethylene, polypropylene, styrene-butadiene rubber, acrylated styrene-butadiene rubber, epoxy resin, nylon, and the like, but the present invention is not limited thereto.

Any one or a mixed solvent of two or more selected from N-methyl pyrrolidone, acetone, water, and the like may be used as the solvent, but the present invention is not limited thereto. Solvents commonly used in the related art may be used.

Also, the anode active material composition may further include a conductive material.

The conductive material is used to impart conductivity to electrodes. In a configured battery, any conductive material may be used as long as they do not cause a chemical change and are electronically conductive. As a specific example, conductive materials including carbon-based materials such as natural graphite, artificial graphite, carbon black, acetylene black, ketjen black, carbon fibers, and the like; metal-based materials such as metal powder or metal fibers, for example, copper, nickel, aluminum, silver, and the like; conductive polymers such as polyphenylene derivatives and the like; or a mixture thereof may be used.

The conductive material may be included at a content of 1 to 90% by weight, more specifically 5 to 80% by weight in the anode active material composition, but the present invention is not limited thereto.

Also, the conductive material may have an average particle size of 0.001 to 100 μm, more specifically 0.01 to 80 μm, but the present invention is not limited thereto.

According to an aspect of the present invention, the anode active material layer may include pores, and may have a porosity of 10 to 35% by volume, more specifically a porosity of 15 to 25% by volume, but the present invention is not limited thereto. When a liquid electrolyte or a gel polymer electrolyte is injected so that the porosity of the anode active material layer falls within the above range, the anode active material layer has a drawback in that it may be difficult to impregnate the electrolyte into the central region of a battery because the anode active material layer has low porosity. However, in an aspect of the present invention, the gel polymer electrolyte may be applied to form a gel polymer electrolyte layer. Therefore, an even and uniformly impregnated electrolyte layer may be formed even when the porosity of the anode active material layer is low.

According to an aspect of the present invention, the anode-electrolyte complex refers to a complex in which the liquid electrolyte or the gel polymer electrolyte is stacked onto or impregnated into an anode so that the liquid electrolyte or the gel polymer electrolyte is integrated with the anode. The impregnation refers to a process in which some or all of the electrolyte is penetrated so that the electrolyte is integrated with the anode.

In the anode-electrolyte complex, when the second electrolyte is a gel polymer electrolyte, the gel polymer electrolyte layer may have a thickness of 0.01 μm to 500 μm. Specifically, the gel polymer electrolyte layer may have a thickness of 0.01 to 100 μm, and more preferably 0.01 to 50 μm, but the present invention is not limited thereto. When the thickness of the gel polymer electrolyte layer satisfies the above thickness range, the ease in manufacturing process may be promoted while improving the performance of the electrochemical device.

(3) Separator-Electrolyte Complex

According to an aspect of the present invention, separators commonly used in the related art may be used as the separator without any limitation. For example, the separator may be a woven or non-woven fabric, a porous film, or the like. Also, the separator may be a multilayer film in which one or two or more layers of these fabrics or films are stacked. As a specific example, a material of the separator may be formed of any one or a mixture of two or more selected from the group consisting of polyethylene, polypropylene, polybutylene, polypentene, polymethylpentene, polyethylene terephthalate, polybutylene terephthalate, polyacetal, polyamide, polycarbonate, polyimide, polyethersulfone, polyphenylene oxide, polyphenylene sulfide, polyethylene naphthalene, and a copolymer thereof, but the present invention is not limited thereto. Also, the thickness of the separator is not limited, and may be in a range of 1 to 1,000 μm, more specifically 10 to 800 μm, the range of which is commonly used in the related art, but the present invention is not limited thereto.

According to an aspect of the present invention, the separator-electrolyte complex refers to a complex in which the liquid electrolyte or the gel polymer electrolyte is stacked onto or impregnated into a separator so that the liquid electrolyte or the gel polymer electrolyte is integrated with the separator. The impregnation refers to a process in which some or all of the electrolyte is penetrated so that the electrolyte is integrated with the separator.

In the separator-electrolyte complex, when the third electrolyte is a gel polymer electrolyte, the gel polymer electrolyte layer may have a thickness of 0.01 μm to 500 μm. Specifically, the gel polymer electrolyte layer may have a thickness of 0.01 to 100 μm, but the present invention is not limited thereto. When the thickness of the gel polymer electrolyte layer satisfies the above thickness range, the ease in manufacturing process may be promoted while improving the performance of the electrochemical device.

(4) Electrochemical Device

According to an aspect of the present invention, the electrochemical device may be a primary battery or a secondary battery in which an electrochemical reaction is likely to occur.

More specifically, the electrochemical device may include a lithium primary battery, a lithium secondary battery, a lithium-sulfur battery, a lithium-air battery, a sodium battery, an aluminum battery, a magnesium battery, a calcium battery, a sodium-air battery, an aluminum-air battery, a magnesium-air battery, a calcium-air battery, a super-capacitor, a dye-sensitized solar cell, a fuel cell, a lead storage battery, a nickel cadmium battery, a nickel hydrogen storage battery, an alkaline battery, and the like, but the present invention is not limited thereto.

(5) Method for Manufacturing Electrochemical Device

Hereinafter, a method for manufacturing an electrochemical device according to an aspect of the present invention will be described in more detail.

The electrochemical device of the present invention may be manufactured according to various aspects as previously described above. Among them, some aspects of the method for manufacturing an electrochemical device will be described. However, it is apparent that these aspects are illustrative only to describe the present invention in detail, but are not intended to limit the scope of the present invention.

A first aspect of the method for manufacturing an electrochemical device according to the present invention includes:

a) applying a first gel polymer electrolyte composition onto a cathode and curing the first gel polymer electrolyte composition to manufacture a cathode-electrolyte complex including a first electrolyte;

b) stacking the cathode-electrolyte complex, a separator, and an anode to manufacture an electrode assembly; and c) sealing the electrode assembly with a packaging material, followed by injection of a liquid electrolyte, wherein the first electrolyte and the liquid electrolyte have different ion conductivities.

A second aspect of the method for manufacturing an electrochemical device according to the present invention includes:

a) applying a second gel polymer electrolyte composition onto an anode and curing the second gel polymer electrolyte composition to manufacture an anode-electrolyte complex including a second electrolyte;

b) stacking a cathode, a separator, and the anode-electrolyte complex to manufacture an electrode assembly; and c) sealing the electrode assembly with a packaging material, followed by injection of a liquid electrolyte, wherein the second electrolyte and the liquid electrolyte have different ion conductivities.

A third aspect of the method for manufacturing an electrochemical device according to the present invention includes:

a) applying a third gel polymer electrolyte composition onto a separator and curing the third gel polymer electrolyte composition to manufacture a separator-electrolyte complex including a third electrolyte;

b) stacking a cathode, the separator-electrolyte complex, and an anode to manufacture an electrode assembly; and c) sealing the electrode assembly with a packaging material, followed by injection of a liquid electrolyte, wherein the third electrolyte and the liquid electrolyte have different ion conductivities.

A fourth aspect of the method for manufacturing an electrochemical device according to the present invention includes:

a) applying a First Gel Polymer Electrolyte composition onto a cathode and curing the first gel polymer electrolyte composition to manufacture a cathode-electrolyte complex including a first electrolyte, and applying a second gel polymer electrolyte composition onto an anode and curing the second gel polymer electrolyte composition to manufacture an anode-electrolyte complex including a second electrolyte;

b) stacking the cathode-electrolyte complex, a separator, and the anode-electrolyte complex to manufacture an electrode assembly; and c) sealing the electrode assembly with a packaging material, followed by injection of a liquid electrolyte, wherein at least any one or more selected from the first electrolyte, the second electrolyte, and the liquid electrolyte have different ion conductivities.

A fifth aspect of the method for manufacturing an electrochemical device according to the present invention includes:

a) applying a first gel polymer electrolyte composition onto a cathode and curing the first gel polymer electrolyte composition to manufacture a cathode-electrolyte complex including a first electrolyte, and applying a third gel polymer electrolyte composition onto a separator and curing the third gel polymer electrolyte composition to manufacture a separator-electrolyte complex including a third electrolyte;

b) stacking the cathode-electrolyte complex, the separator-electrolyte complex, and an anode to manufacture an electrode assembly; and c) sealing the electrode assembly with a packaging material, followed by injection of a liquid electrolyte, wherein at least any one or more selected from the first electrolyte, the third electrolyte, and the liquid electrolyte have different ion conductivities.

A sixth aspect of the method for manufacturing an electrochemical device according to the present invention includes:

a) applying a second gel polymer electrolyte composition onto an anode and curing the second gel polymer electrolyte composition to manufacture an anode-electrolyte complex including a second electrolyte, and applying a third gel polymer electrolyte composition onto a separator and curing the third gel polymer electrolyte composition to manufacture a separator-electrolyte complex including a third electrolyte;

b) stacking a cathode, the separator-electrolyte complex, and the anode-electrolyte complex to manufacture an electrode assembly; and c) sealing the electrode assembly with a packaging material, followed by injection of a liquid electrolyte, wherein at least any one or more selected from the second electrolyte, the third electrolyte, and the liquid electrolyte have different ion conductivities.

According to the first to sixth aspects, at least any one or more selected from the first electrolyte, the second electrolyte, and the liquid electrolyte may include any one or more selected from different types of solvents, different types of dissociable salts, and different concentrations of the dissociable salts.

In the first to sixth aspects, step b) may be selected from the following steps:

b-1) stacking the cathode or the cathode-electrolyte complex, the separator or the separator-electrolyte complex, and the anode or the anode-electrolyte complex and cutting the stacked body into a certain shape to manufacture an electrode assembly; or b-2) cutting each of the cathode or the cathode-electrolyte complex, the separator or the separator-electrolyte complex, and the anode or the anode-electrolyte complex into a certain shape, and stacking the cut electrodes or electrolyte complexes to manufacture an electrode assembly.

A seventh aspect of the method for manufacturing an electrochemical device according to the present invention includes:

i) applying a first gel polymer electrolyte composition onto a cathode and curing the first gel polymer electrolyte composition to manufacture a cathode-electrolyte complex including a first electrolyte, applying a second gel polymer electrolyte composition onto an anode and curing the second gel polymer electrolyte composition to manufacture an anode-electrolyte complex including a second electrolyte, and applying a third gel polymer electrolyte composition onto a separator and curing the third gel polymer electrolyte composition to manufacture a separator-electrolyte complex including a third electrolyte; and ii) stacking the cathode-electrolyte complex, the separator-electrolyte complex, and the anode-electrolyte complex to manufacture an electrode assembly, wherein at least any one or more selected from the first electrolyte, the second electrolyte, and the third electrolyte have different ion conductivities.

In the seventh aspect, at least one or more selected from the first gel polymer electrolyte composition, the second gel polymer electrolyte composition, and the third gel polymer electrolyte composition may include any one or more selected from different types of solvents, different types of dissociable salts, and different concentrations of the dissociable salts. Also, the types or concentrations of the monomers may be different, and the present invention is not intended to exclude the different types or concentrations of the monomers.

Also, in the seventh aspect, step ii) may be selected from the following steps:

ii-1) stacking the cathode-electrolyte complex, the separator-electrolyte complex, and the anode-electrolyte complex and cutting the stacked body into a certain shape; or ii-2) cutting each of the cathode-electrolyte complex, the separator-electrolyte complex, and the anode-electrolyte complex into a certain shape, and stacking the cut electrodes or electrolyte complexes.

Also, in the fifth aspect, the method for manufacturing an electrochemical device may include iii) sealing the electrode assembly with a packaging material after step ii).

In an aspect of the method for manufacturing an electrochemical device according to the present invention, a gel polymer electrolyte layer may be continuously produced by applying a gel polymer electrolyte using coating methods such as bar coating, spin coating, slot die coating, dip coating, spray coating, and the like, as well as printing methods such as ink-jet printing, gravure printing, gravure offset, aerosol printing, stencil printing, screen printing, and the like.

More specifically, a composition for polymerizing a gel polymer electrolyte may be applied and cross-linked by ultraviolet irradiation or heating so that a liquid electrolyte can be uniformly distributed in a network structure of a cross-linked polymer matrix. In this case, a solvent evaporation process may not be required.

Also, because a gel polymer electrolyte may be formed using an application method, a separate electrolyte conforming to the characteristics of each electrode may be applied to form an electrolyte layer. In addition, because the gel polymer electrolyte may be formed using an application method, an electrolyte may be even and uniformly formed on electrodes and a separator, compared to an injection method. Further, because the gel polymer electrolyte has a cross-linked structure, components in the gel polymer electrolyte are poorly miscible with the liquid electrolyte even when used for a long time.

According to an aspect of the present invention, the liquid electrolyte may be injected after sealing with a packaging material.

Compositions for polymerizing the liquid electrolyte and the gel polymer electrolyte are as previously described above, and a repeated description thereof will be omitted.

Hereinafter, the present invention will be described in further detail with reference to Examples and Comparative Examples thereof. However, it should be understood that the following Examples and Comparative Examples are illustrative only to describe the present invention in detail, but are not intended to limit the scope of the present invention.

1) Ion Conductivity

The ion conductivity may be determined using the following calculation formulas.

$$IC_1 = (\tau_{cathode}^2 \times IC_{cathode})/P_{cathode} \quad \text{[Calculation Formula 1]}$$

$$IC_2 = (\tau_{anode}^2 \times IC_{anode})/P_{anode} \quad \text{[Calculation Formula 2]}$$

$$IC_3 = (\tau_{separator}^2 \times IC_{separator})/P_{separator} \quad \text{[Calculation Formula 3]}$$

wherein $IC_1$, $IC_2$, and $IC_3$ represent ion conductivities of the first electrolyte, the second electrolyte, and the third electrolyte, respectively, $IC_{cathode}$, $IC_{anode}$, and $IC_{separator}$ represent ion conductivities of the cathode-electrolyte complex, the anode-electrolyte complex, and the separator-electrolyte complex, respectively, $\tau_{cathode}$, $\tau_{anode}$, and $P_{separator}$ represent degrees of tortuosity of the cathode, the anode, and the separator, respectively, and $P_{cathode}$, $P_{anode}$, and $P_{separator}$ represent porosities of the cathode, the anode, and the separator, respectively.

To calculate the ion conductivities of the electrolytes, the porosities (% by volume) of the specimens may be measured for each of the cathode, the anode, and the separator using a mercury intrusion porosimeter. Ion conductivities of the cathode-electrolyte complex, the anode-electrolyte complex, and the separator-electrolyte complex may be measured using a reference electrolyte whose ion conductivity is known (in the applicant's patent, a liquid electrolyte in which 1 mole of $LiPF_6$ is dissolved in a mixed solvent of 50% by volume of ethylene carbonate and 50% by volume of ethyl methyl carbonate is used as the reference electrolyte), and the degrees of tortuosity of the cathode, the anode, and the separator may be calculated according to the calculation formulas.

The ion conductivity may be measured using an alternating current impedance measurement method according to the temperature after each of the cathode-electrolyte complex, the anode-electrolyte complex, and the separator-electrolyte complex is cut into a circular shape with a diameter of 18 mm, and each of the coin cells (2032) are manufactured. The ion conductivity was measured at a frequency band of 1 MHz to 0.01 Hz using VMP3 measuring equipment.

The sealing of an electrochemical device including any electrolyte was removed to separate a cathode-electrolyte complex, an anode-electrolyte complex, and a separator-electrolyte complex. Thereafter, each of the complexes was stored in a dimethyl carbonate solvent for 24 hours, stored in an acetone solvent for 24 hours, and then stored again in dimethyl carbonate solvent for 24 hours to remove an electrolyte in each of the complexes. Then, each of the complexes was dried for 24 hours under a vacuum atmosphere (in this case, the cathode and anode from which the electrolyte was dried at a temperature of 130° C., and the separator was dried at a temperature of 60° C.). The degrees of tortuosity of the cathode, the anode, and the separator, from which the electrolyte was removed, were calculated by the above-described method using the porosity and the reference electrolyte, and the ion conductivities of the cathode-electrolyte complex, the anode-electrolyte complex, and the separator-electrolyte complex before the removal of the electrolyte were measured to measure the ion conductivities of the first electrolyte, the second electrolyte, and the third electrolyte according to the calculation formulas.

Hereinafter, a Nyquist plot obtained by measuring the ion conductivities of the cathode-electrolyte complex, the anode-electrolyte complex, and the separator-electrolyte complex will be described in detail. The cathode-electrolyte complex and the anode-electrolyte complex are composite conductors, that is, electronic conductors and ionic conductors. Nyquist plots for the cathode-electrolyte complex and the anode-electrolyte complex represent behaviors of semicircles. In this case, the semicircles are divided into resistance ($R_1$) in a high frequency region and resistance ($R_2$) in a low frequency region, and the resistance to ion conduction may be calculated according to the following calculation formula.

$$R_{ion} = R_2 - R_1 \quad \text{[Calculation Formula 4]}$$

The separator-electrolyte complex is an ionic conductor that shows a vertically rising behavior in the Nyquist plot, and an impedance resistance value in the horizontal axis represents the resistance to ion conduction. The ion conductivities of the cathode-electrolyte complex, the anode-electrolyte complex, and the separator-electrolyte complex may be calculated from the resistance values to ion conduction as obtained above according to the following calculation formula.

$$IC = L/(R_{ion} \times A) \quad \text{[Chemical Formula 5]}$$

wherein L represents a thickness of a specimen (thicknesses of the cathode and the anode(excluding the current collector) and a thickness of the separator), and A represents an area of the specimen.

2) Slope of Arrhenius Plot

In the case of the slope of the Arrhenius plot, a linear slope was calculated at 20 to 80° C. from the data of ion conductivities according to the temperature as obtained above by plotting the reciprocal (1/T) of the temperature T(K) in the horizontal axis and the algebra (ln(IC)) of the ion conductivity in the vertical axis.

3) Viscosity

The viscosity was measured at 25° C. using a Brookfield viscometer (Dv2TRV-cone&plate, CPA-52Z).

4) Evaluation of Battery Performance

The initial charge/discharge capacity of a lithium battery was observed at a current of 0.1 C (=0.3 mA/cm$^2$) in a voltage range of 3.0 to 4.2 V at room temperature (25° C.), and the lifespan characteristics of the lithium battery according to the number of charge/discharge cycles at a current of 0.2 C (=0.6 mA/cm$^2$) were observed.

The initial discharge capacity is a discharge capacity (mAh/cm$^2$) in the first cycle. The initial charge/discharge efficiency is a ratio of charge capacity and discharge capacity in the first cycle. The capacity retention rate with respect to the lifespan characteristics was calculated according to the following equation.

$$\text{Capacity retention rate (\%)} = [\text{Discharge capacity in } 200^{th} \text{ cycle/Discharge capacity in } 1^{st} \text{ cycle}] \times 100$$

5) Porosity

For the cathode and the anode, the porosities (% by volume) of the specimens were measured using mercury intrusion porosimetry (Equipment name: AutoPore IV 9500, and Equipment manufacturer: Micromeritics Instrument Corp.). To exclude an effect of the pores formed by stacking the specimens, the porosity of an electrode was calculated under the condition of a pressure range of 30 psia to 60,000 psia.

6) Infrared Spectroscopy

A charge/discharge current was applied to an electrode assembly in which an initial formation process was completed to separate a cathode, an anode, and a separator from the electrode assembly, and each of the cathode, the anode, and the separator was subjected to Fourier transform infrared spectroscopy (Equipment name: 670-IR, and Equipment manufacturer: Varian). As result, it was confirmed that the different types of solvents, the different types of salts, and the different concentrations of the salts were distinguished from the absorption spectra obtained by optically dividing reflected light when the specimens were irradiated with infrared light, thereby determining the peak intensities derived from the material characteristics.

7) X-ray Photoelectron Spectroscopy

A charge/discharge current was applied to an electrode assembly in which an initial formation process was completed to separate a cathode, an anode, and a separator from the electrode assembly, and each of the cathode, the anode, and the separator was subjected to X-ray photoelectron spectroscopy (Equipment name: K-Alpha, and Equipment manufacturer: Thermo Fisher). As result, it was confirmed that the presence/absence and chemical binding state of elements including the different types of the solvents and salts were distinguished and determined from the energy of photoelectrons released from the specimens when irradiated with X-rays.

8) Inductively Coupled Plasma Mass Spectrometry

A charge/discharge current was applied to an electrode assembly in which an initial formation process was completed to separate a cathode, an anode, and a separator from the electrode assembly, and each of the cathode, the anode, and the separator was subjected to inductively coupled plasma mass spectrometry (Equipment name: ELAN DRC-II, and Equipment manufacturer: Perkin Elmer). As result, it was confirmed that the different types of solvents, the different types of salts, and the different concentrations of the salts were distinguished and determined by ionizing the salts included in the specimens and separating the corresponding ions using a mass spectrometer.

9) Nuclear Magnetic Resonance Spectroscopy

A charge/discharge current was applied to an electrode assembly in which an initial formation process was completed to separate a cathode, an anode, and a separator from the electrode assembly, and each of the cathode, the anode, and the separator was subjected to 2D nuclear magnetic resonance spectroscopy (Equipment name: AVANCE III HD, and Equipment manufacturer: Bruker). As result, it was confirmed that the different types of solvents, the different types of salts, and the different concentrations of the salts were distinguished and determined based on the information on the chemical environments around the atomic nuclei and the spin coupling to the neighboring atoms using a nuclear magnetic resonance phenomenon of the atomic nuclei, which occurred when a magnetic field is applied to a performance improving agent included in the specimens.

10) Time-of-Flight Secondary Ion Mass Spectrometry

A charge/discharge current was applied to an electrode assembly in which an initial formation process was completed to separate a cathode, an anode, and a separator from the electrode assembly, and each of the cathode, the anode, and the separator was subjected to time-of-flight secondary ion mass spectrometry (Equipment name: TOF-SIMS 5, and Equipment manufacturer: ION TOF). As result, it was confirmed that the different types of solvents, the different types of salts, and the different concentrations of the salts were distinguished and determined through the mass spectrometric analysis of secondary ions generated in the specimens.

EXAMPLE 1

1) Manufacture of Cathode-Electrolyte Complex

95% by weight of lithium-cobalt composite oxide ($LiCoO_2$) having an average particle size of 5 μm as a cathode active material, 2% by weight of Super-P having an average particle size of 40 nm as a conductive material, and 3% by weight of poly(vinylidene fluoride) as a binder were added to N-methyl-2-pyrrolidone as an organic solvent, so that the solid content reached 50% by weight, to manufacture a cathode active material composition (a cathode mixture slurry).

The cathode active material composition was applied onto an aluminum thin film having a thickness of 20 pm using a doctor blade, dried at 120° C., and then rolled using a roll press to prepare a cathode (having a porosity of 15% by volume) coated with an active material layer having a thickness of 40 μm.

A first electrolyte composition was coated onto the active material layer of the manufactured cathode using a doctor blade, and cross-linked by irradiation with ultraviolet rays at 2,000 $mW/cm^2$ for 20 seconds, and a cathode-electrolyte complex having a thickness of 41 μm, on which the first gel polymer electrolyte layer was formed, was manufactured.

The first electrolyte composition was obtained by mixing 5% by weight of trimethylolpropane ethoxylate triacrylate, 0.1% by weight of hydroxy methyl phenyl propanone as a photoinitiator, and 94.9% by weight of a liquid electrolyte. A liquid electrolyte in which 1 mole of $LiPF_6$ was dissolved in propylene carbonate, which was a cyclic carbonate-based organic solvent having excellent electrochemical oxidation stability, was used as the liquid electrolyte. The first gel polymer electrolyte composition had a viscosity at 25° C. of 10 cps.

2) Manufacture of Anode-Electrolyte Complex

96% by weight of natural graphite powder as an anode active material, 2% by weight of carbon black having an average particle size of 40 nm as a conductive material, 1% by weight of a styrene-butadiene rubber as a binder, and 1% by weight of carboxymethyl cellulose were added to water to manufacture an anode active material composition (an anode mixture slurry). The anode active material composition was applied onto a copper thin film having a thickness of 20 μm using a doctor blade, dried at 120° C., and then rolled using a roll press to prepare an anode (having a porosity of 20% by volume) coated with an active material layer having a thickness of 40 μm.

A second electrolyte composition was coated onto the active material layer of the manufactured anode using a doctor blade to manufacture an anode-electrolyte complex.

A liquid electrolyte in which 4 moles of LiFSI was dissolved in a dimethoxyethane solvent was used as the second electrolyte composition. The second electrolyte composition had a viscosity at 25° C. of 60 cps.

3) Manufacture of Separator-Electrolyte Complex

A polyolefin-based microporous film (Celgard, LLC., Celgard3501) having a thickness of 25 μm was used as a separator.

A third electrolyte composition was coated onto the prepared separator using a doctor blade to manufacture a separator-electrolyte complex.

A liquid electrolyte in which 1 mole of $LiPF_6$ was dissolved in propylene carbonate was used as the third electrolyte composition. The third electrolyte composition had a viscosity at 25° C. of 8.4 cps.

4) Manufacture of Lithium Ion Secondary Battery

The cathode-electrolyte complex, the separator-electrolyte complex, and the anode-electrolyte complex were stacked, and then blanked to manufacture a battery (a coin cell).

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

EXAMPLE 2

The first electrolyte composition and the second electrolyte composition were prepared in the same manner as in Example 1, and a third electrolyte composition obtained by mixing 5% by weight of trimethylolpropane ethoxylate triacrylate, 0.1% by weight of hydroxy methyl phenyl propanone as a photoinitiator, and 94.9% by weight of a liquid electrolyte in which 1 mole of $LiPF_6$ was dissolved in a propylene carbonate solvent was coated using a doctor blade, and cross-linked by irradiation with ultraviolet rays at 2,000 $mW/cm^{-2}$ for 20 seconds to manufacture a battery (a coin cell) in the same manner as in Example 1, except that a separator-electrolyte complex having a thickness of 30 μm, on which a third gel polymer electrolyte layer was formed, was manufactured.

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

EXAMPLE 3

The first electrolyte composition and the second electrolyte composition were prepared in the same manner as in Example 1, and a third electrolyte composition obtained by mixing 5% by weight of trimethylolpropane ethoxylate triacrylate, 0.1% by weight of hydroxy methyl phenyl propanone as a photoinitiator, and 94.9% by weight of a liquid electrolyte in which 4 moles of $LiPF_6$ was dissolved in a propylene carbonate solvent was coated onto a separator using a doctor blade, and cross-linked by irradiation with ultraviolet rays at 2,000 $mW/cm^{-2}$ for 20 seconds to manufacture a battery (a coin cell) in the same manner as in Example 1, except that a separator-electrolyte complex having a thickness of 30 μm, on which a third gel polymer electrolyte layer was formed, was manufactured.

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

EXAMPLE 4

The first electrolyte composition was prepared in the same manner as in Example 1, and a second electrolyte composition obtained by mixing 5% by weight of trimethylolpropane ethoxylate triacrylate, 0.1% by weight of hydroxy methyl phenyl propanone as a photoinitiator, and 94.9% by weight of a liquid electrolyte in which 4 moles of LiFSI was dissolved in a dimethoxyethane solvent was coated onto an active material layer of an anode using a doctor blade, and cross-linked by irradiation with ultraviolet rays at 2,000 $mW/cm^{-2}$ for 20 seconds to manufacture an anode-electrolyte complex having a thickness of 41 μm, on which a second gel polymer electrolyte layer was formed. Also, a third electrolyte composition obtained by mixing 5% by weight of trimethylolpropane ethoxylate triacrylate, 0.1% by weight of hydroxy methyl phenyl propanone as a photoinitiator, and 94.9% by weight of a liquid electrolyte in which 1 mole of $LiPF_6$ was dissolved in a propylene carbonate solvent was coated onto a separator using a doctor blade, and cross-linked by irradiation with ultraviolet rays at 2,000 $mW/cm^{-2}$ for 20 seconds to manufacture a battery (a coin cell) in the same manner as in Example 1, except that a separator-electrolyte complex having a thickness of 30 μm, on which a third gel polymer electrolyte layer was formed, was manufactured.

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

EXAMPLE 5

The first electrolyte composition was prepared in the same manner as in Example 1, and a battery (a coin cell) was manufactured in the same manner as in Example 1, except that 5% by weight of trimethylolpropane ethoxylate triacrylate, 0.1% by weight of hydroxy methyl phenyl propanone as the photoinitiator, and 94.9% by weight of a liquid electrolyte in which 4 moles of LiFSI was dissolved in a dimethoxyethane solvent were mixed and the resulting mixture was used as the second electrolyte composition, and 5% by weight of trimethylolpropane ethoxylate triacrylate, 0.1% by weight of hydroxy methyl phenyl propanone as the photoinitiator, and 94.9% by weight of a liquid electrolyte in which 4 moles of LiFSI was dissolved in a dimethoxyethane solvent were mixed and the resulting mixture was used as the third electrolyte composition. The second electrolyte composition obtained by mixing 5% by weight of trimethylolpropane ethoxylate triacrylate, 0.1% by weight of hydroxy methyl phenyl propanone as the photoinitiator, and 94.9% by weight of a liquid electrolyte in which 4 moles of LiFSI was dissolved in a dimethoxyethane solvent was coated onto an active material layer of the anode using a doctor blade, and cross-linked by irradiation with ultraviolet rays at 2,000 $mW/cm^{-2}$ for seconds to manufacture an anode-electrolyte complex having a thickness of 41 μm, on which a second gel polymer electrolyte layer was formed. Then, the third electrolyte composition obtained by mixing 5% by weight of trimethylolpropane ethoxylate triacrylate, 0.1% by weight of hydroxy methyl phenyl propanone as the photoinitiator, and 94.9% by weight of a liquid electrolyte in which 4 moles of LiFSI was dissolved in a propylene carbonate solvent was coated onto a separator using a doctor blade, and cross-linked by irradiation with ultraviolet rays at 2,000 $mW/cm^{-2}$ for 20 seconds to manufacture a battery (a coin cell) in the same manner as in Example 1, except that a separator-electrolyte complex having a thickness of 30 μm, on which a third gel polymer electrolyte layer was formed, was manufactured.

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

COMPARATIVE EXAMPLE 1

The same cathode, anode, and separator as in Example 1 were used, and the same electrolyte composition was used in all of the cathode, the anode, and the separator.

A composition obtained by mixing 5% by weight of trimethylolpropane ethoxylate triacrylate, 0.1% by weight of hydroxy methyl phenyl propanone as the photoinitiator, and 94.9% by weight of a liquid electrolyte in which 1 mole of $LiPF_6$ was dissolved in a propylene carbonate solvent was used as the gel polymer electrolyte. The gel polymer electrolyte was coated onto each of a cathode active material layer, an anode active material layer, and a separator using a doctor blade, and cross-linked by irradiation with ultraviolet rays at 2,000 $mW/cm^{-2}$ for 20 seconds to manufacture a battery (a coin cell) in the same manner as in Example 1, except that a cathode-electrolyte complex having a thickness of 41 μm, an anode-electrolyte complex having a thickness of 41 μm, and a separator-electrolyte complex having a thickness of 30 μm were manufactured.

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

COMPARATIVE EXAMPLE 2

The same cathode, anode, and separator as in Example 1 were used, and the same electrolyte composition was used in all of the cathode, the anode, and the separator.

A composition obtained by mixing 5% by weight of trimethylolpropane ethoxylate triacrylate, 0.1% by weight of hydroxy methyl phenyl propanone as the photoinitiator, and 94.9% by weight of a liquid electrolyte in which 4 moles of LiFSI was dissolved in a dimethoxyethane solvent was used as the gel polymer electrolyte. The gel polymer electrolyte was coated onto each of a cathode active material layer, an anode active material layer, and a separator using a doctor blade, and cross-linked by irradiation with ultraviolet rays at 2,000 $mW/cm^{-2}$ for 20 seconds to manufacture a battery (a coin cell) in the same manner as in Example 1, except that cathode-electrolyte complex having a thickness of 41 μm, an anode-electrolyte complex having a thickness of 41 μm, and a separator-electrolyte complex having a thickness of 30 μm were manufactured.

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

COMPARATIVE EXAMPLE 3

The same cathode, anode, and separator as in Example 1 were used, and the same liquid electrolyte was injected into all of the cathode, the anode, and the separator to manufacture a battery (a coin cell). A liquid electrolyte in which 1 mole of $LiPF_6$ was dissolved in a mixed solvent of 50% by volume of ethylene carbonate and 50% by volume of diethyl carbonate was used as the liquid electrolyte.

The charge/discharge efficiency of the coin cell at a charge/discharge current rate of 0.1 C, the lifespan characteristics of the coin cell at a charge/discharge current rate of 0.2 C, and the ion conductivity of each electrolyte were observed. The results are listed in Table 1 below.

TABLE 1

| | Charge/discharge efficiency (%) | Capacity retention rate (%) | $IC_1$ (mS/cm) | $IC_2$ (mS/cm) | $IC_3$ (mS/cm) |
|---|---|---|---|---|---|
| Example 1 | 99.8 | 98 | 4.92 | 5.7 | 6.07 |
| Example 2 | 99.3 | 96 | 4.92 | 5.7 | 4.92 |
| Example 3 | 99.5 | 97 | 4.92 | 5.7 | 4.75 |
| Example 4 | 98.9 | 95 | 4.92 | 4.75 | 4.92 |
| Example 5 | 99.1 | 96 | 4.92 | 4.75 | 4.75 |
| Comparative Example 1 | Not measured | Not measured | 4.92 | 4.92 | 4.92 |
| Comparative Example 2 | Not measured | Not measured | 4.75 | 4.75 | 4.75 |
| Comparative Example 3 | 94.8 | 87 | 7.5 | 7.5 | 7.5 |

Although the present invention has been described with reference to certain subject matters and limited examples thereof, it should be understood that the subject matters and the limited examples are merely provided to aid in understanding the present invention more comprehensively, but are not intended to limit the present invention. Therefore, it will be apparent to those skilled in the art to which the present invention belongs that various changes and modifications can be made from such description.

Thus, the scope of the present invention is not intended to be limited to the examples described herein, and thus all types of the appended claims, and equivalents or equivalent modifications thereof fall within the scope of the present invention.

The invention claimed is:

1. An electrochemical device comprising:

a cathode-electrolyte complex comprising a first electrolyte in a cathode, wherein the first electrolyte is applied onto or impregnated into the cathode to be integrated therewith;

an anode-electrolyte complex comprising a second electrolyte in an anode, wherein the second electrolyte is applied onto or impregnated into the anode to be integrated therewith; and a separator-electrolyte complex comprising a third electrolyte in a separator, wherein the third electrolyte is applied onto or impregnated into the separator to be integrated therewith, wherein the first electrolyte is a first gel polymer electrolyte, and the first electrolyte, the second electrolyte, and the third electrolyte satisfy the following i), ii) or iii), i) the second electrolyte is a second gel polymer electrolyte and the third electrolyte is a liquid electrolyte, and wherein the first electrolyte and the second electrolyte have ion conductivities different from each other, ii) the second electrolyte is a second gel polymer electrolyte and the third electrolyte is a third gel polymer electrolyte, and wherein the third electrolyte has an ion conductivity different from those of the first electrolyte and the second electrolyte, iii) the second electrolyte is a liquid electrolyte and the third electrolyte is a third gel polymer electrolyte, and wherein the first electrolyte and the third electrolyte have ion conductivities different from each other.

2. The electrochemical device of claim 1, wherein the first gel polymer electrolyte, the second gel polymer electrolyte or the third gel polymer electrolyte comprises a cross-linked polymer matrix, a solvent, and a dissociable salt.

3. The electrochemical device of claim 1, wherein a difference in ion conductivities in i), ii) or iii) results from any one or more selected from different types of solvents, different types of dissociable salts, and different concentrations of the dissociable salts.

4. The electrochemical device of claim 2, wherein the cross-linked polymer matrix has a semi-interpenetrating network (semi-IPN) structure because the cross-linked polymer matrix further comprises a linear polymer.

5. The electrochemical device of claim 1, wherein a difference in ion conductivities in i), ii) or iii) is greater than or equal to 0.1 mS/cm.

6. The electrochemical device of claim 1, wherein at least two selected from the first electrolyte, the second electrolyte, and the third electrolyte have different slopes calculated at a temperature of 20 to 80° C. from an Arrhenius plot of the ion conductivities.

7. The electrochemical device of claim 2, wherein any one or a mixed solvent of two or more selected from a carbonate-based solvent, a nitrile-based solvent, an ester-based solvent, an ether-based solvent, a glyme-based solvent, a ketone-based solvent, an alcohol-based solvent, an aprotic solvent, and water are used as the type of the solvent.

8. The electrochemical device of claim 7, wherein the carbonate-based solvent comprises any one or a mixture of two or more selected from dimethyl carbonate, diethyl carbonate, dipropyl carbonate, methylpropyl carbonate, ethylpropylcarbonate, methylethyl carbonate, ethylene carbonate, propylene carbonate, and butylene carbonate, the nitrile-based solvent comprises any one or a mixture of two or more selected from acetonitrile, succinonitrile, adiponitrile, and sebaconitrile, the ester-based solvent comprises any one or a mixture of two or more selected from methyl acetate, ethyl acetate, n-propyl acetate, 1,1-dimethylethyl acetate, methyl propionate, ethyl propionate, γ-butylolactone, decanolide, valerolactone, mevalonolactone, and caprolactone, the ether-based solvent comprises any one or a mixture of two or more selected from dimethyl ether, dibutyl ether, tetraglyme, diglyme, dimethoxyethane, 2-methyltetrahydrofuran, and tetrahydrofuran, the glyme-based solvent comprises any one or a mixture of two or more selected from ethylene glycol dimethylether, triethylene glycol dimethyl ether, and tetraethylene glycol dimethyl ether, the ketone-based solvent is cyclohexanone, the alcohol-based solvent comprises anyone selected from ethyl alcohol and isopropyl alcohol, or a mixture thereof and the aprotic solvent comprises any one or a mixture of two or more selected from a nitrile-based solvent, an amide-based solvent, a dioxolane-based solvent, and a sulfolane-based solvent.

9. The electrochemical device of claim 2, wherein the dissociable salt comprises any one or a mixture of two or more selected from lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bisoxalatoborate ($LiB(C_2O_4)_2$), lithium trifluoromethanesulfonyl imide ($LiN(C_xF_{2x+1}SO_2)(C_yF_{2y+1}SO_2)$) (wherein x and y are natural numbers), and derivatives thereof.

10. The electrochemical device of claim 3, wherein a difference in salt concentrations between at least two selected from the first electrolyte, the second electrolyte, and the third electrolyte is greater than or equal to 0.1 M.

11. The electrochemical device of claim 1, wherein the cathode comprises a cathode active material layer, the anode comprises an anode active material layer, and the cathode active material layer and the anode active material layer comprise pores.

12. The electrochemical device of claim 11, wherein the cathode active material layer has a porosity of 5 to 30% by volume, and the anode active material layer has a porosity of 10 to 35% by volume.

13. The electrochemical device of claim 12, wherein the cathode active material layer has a porosity of 10 to 20% by volume, and the anode active material layer has a porosity of 15 to 25% by volume.

14. The electrochemical device of claim 1, wherein the cathode comprises a cathode active material layer, the anode comprises a lithium metal layer, the cathode active material layer comprises pores.

15. The electrochemical device of claim 14, wherein the cathode active material layer has a porosity of 5 to 30% by volume.

16. The electrochemical device of claim 15, wherein the cathode active material layer has a porosity of 10 to 20% by volume.

17. The electrochemical device of claim 1, wherein the electrochemical device is a primary battery or a secondary battery in which an electrochemical reaction is likely to occur.

18. The electrochemical device of claim 1, wherein the electrochemical device comprises one selected from the group consisting of a lithium primary battery, a lithium secondary battery, a lithium-sulfur battery, a lithium-air battery, a sodium battery, an aluminum battery, a magnesium battery, a calcium battery, a zinc battery, a zinc-air battery, a sodium-air battery, an aluminum-air battery, a magnesium-air battery, a calcium-air battery, a super-capacitor, a dye-sensitized solar cell, a fuel cell, a lead storage battery, a nickel cadmium battery, a nickel hydrogen storage battery, and an alkaline battery.

* * * * *